United States Patent
Lu et al.

(10) Patent No.: US 9,822,951 B2
(45) Date of Patent: Nov. 21, 2017

(54) LED RETROFIT LENS FOR FLUORESCENT TUBE

(71) Applicant: CREE, INC., Durham, NC (US)

(72) Inventors: Dong Lu, Cary, NC (US); Nicholas W. Medendorp, Jr., Raleigh, NC (US); Randy Bernard, Cary, NC (US); Paul Kenneth Pickard, Morrisville, NC (US)

(73) Assignee: CREE, INC., Durham, NC (US)

( * ) Notice: Subject to any disclaimer, the term of this patent is extended or adjusted under 35 U.S.C. 154(b) by 326 days.

(21) Appl. No.: 14/020,750

(22) Filed: Sep. 6, 2013

(65) Prior Publication Data
US 2014/0078727 A1 Mar. 20, 2014

Related U.S. Application Data

(63) Continuation-in-part of application No. 12/961,385, filed on Dec. 6, 2010, and a continuation-in-part of application No. 13/763,270, filed on Feb. 8, 2013.

(51) Int. Cl.
*F21V 13/04* (2006.01)
*F21V 15/01* (2006.01)
(Continued)

(52) U.S. Cl.
CPC ............. *F21V 13/04* (2013.01); *F21S 4/20* (2016.01); *F21V 15/013* (2013.01); *G02B 5/045* (2013.01);
(Continued)

(58) Field of Classification Search
CPC .. F21S 4/003; F21S 4/20; F21V 13/04; F21V 15/013; F21V 3/02; F21V 5/02;
(Continued)

(56) References Cited

U.S. PATENT DOCUMENTS

D853,825 10/1931 Guth .............................. D26/24
4,118,763 A 10/1978 Osteen .......................... 359/833
(Continued)

FOREIGN PATENT DOCUMENTS

CN 101188261 5/2008
CN 1019844284 3/2011
(Continued)

OTHER PUBLICATIONS

International Search Report and Written Opinion from Appl. No. PCT/CN2013/072772, dated Dec. 19, 2013.
(Continued)

*Primary Examiner* — Bao Q Truong
(74) *Attorney, Agent, or Firm* — Koppel, Patrick, Heybl & Philpott

(57) ABSTRACT

Light fixtures having light bar elements therein. In order to mimic the size and appearance of fluorescent bulbs in existing troffer-style and surface-mount fixtures, LEDs are may be arranged on light bars with integrated lenses to both diffuse the light and shape the output beam. One or more LEDs can be mounted, sometimes in clusters, along the length of a base of the light bar which can then be inserted into a fixture. An elongated lens is mounted to the base over the LEDs so that light emitted from the LEDs interacts with the lens before it escapes the fixture. These elongated lenses may be extruded from a diffusive material, for example, and can be shaped in various ways. For example, the lenses may be shaped to disperse more light to the sides, i.e., in a direction away from a normal axis that is perpendicular to the base.

24 Claims, 11 Drawing Sheets

(51) Int. Cl.
*G02B 19/00* (2006.01)
*G02B 5/04* (2006.01)
*F21S 4/20* (2016.01)
*F21V 5/04* (2006.01)
*F21V 3/02* (2006.01)
*F21V 5/02* (2006.01)
*F21Y 105/10* (2016.01)
*F21K 9/61* (2016.01)
*F21Y 103/10* (2016.01)
*F21Y 115/10* (2016.01)
*F21Y 113/13* (2016.01)

(52) U.S. Cl.
CPC ..... *G02B 19/0028* (2013.01); *G02B 19/0066* (2013.01); *F21K 9/61* (2016.08); *F21V 3/02* (2013.01); *F21V 5/02* (2013.01); *F21V 5/04* (2013.01); *F21Y 2103/10* (2016.08); *F21Y 2105/10* (2016.08); *F21Y 2113/13* (2016.08); *F21Y 2115/10* (2016.08)

(58) Field of Classification Search
CPC .... F21V 5/04; F21Y 2103/10; F21Y 2113/13; F21Y 2105/10; F21Y 2115/10; G02B 5/045; G02B 19/0028; G02B 19/0066; F21K 9/61
See application file for complete search history.

(56) References Cited

U.S. PATENT DOCUMENTS

| | | | |
|---|---|---|---|
| 4,300,185 A * | 11/1981 | Wakamatsu | F21S 8/00 362/147 |
| 4,464,707 A | 8/1984 | Forrest | 362/271.06 |
| 4,472,767 A | 9/1984 | Wenman | 362/147 |
| 4,946,547 A | 8/1990 | Palmour et al. | |
| 5,200,022 A | 4/1993 | Kong et al. | |
| RE34,861 E | 2/1995 | Davis et al. | |
| 5,530,628 A * | 6/1996 | Ngai | F21V 5/02 362/127 |
| 5,690,415 A | 11/1997 | Krehl | 362/125 |
| 5,823,663 A | 10/1998 | Bell et al. | 362/362 |
| D407,473 S | 3/1999 | Wimbock | D23/328 |
| 5,907,218 A | 5/1999 | Altman et al. | |
| 5,951,150 A | 9/1999 | Helstern | 362/293 |
| 6,155,699 A | 12/2000 | Miller et al. | 362/293 |
| 6,210,025 B1 | 4/2001 | Schmidt et al. | 362/362 |
| 6,435,697 B1 | 8/2002 | Simmons | 362/219 |
| 6,443,598 B1 | 9/2002 | Morgan | 362/342 |
| 6,523,974 B2 | 2/2003 | Engel | 362/224 |
| 6,536,924 B2 | 3/2003 | Segretto | 362/247 |
| 6,667,451 B1 | 12/2003 | Hart | 200/314 |
| 6,739,734 B1 | 5/2004 | Hulgan | 362/243 |
| D496,121 S | 9/2004 | Santoro | D26/74 |
| 6,914,194 B2 | 7/2005 | Fan | |
| 6,948,840 B2 | 9/2005 | Grenda et al. | 362/555 |
| 7,021,797 B2 | 4/2006 | Minano et al. | 362/355 |
| 7,049,761 B2 | 5/2006 | Timmermans et al. | 315/246 |
| 7,131,747 B1 | 11/2006 | Yates | 362/219 |
| 7,213,940 B1 | 5/2007 | Van de Ven et al. | 362/231 |
| 7,217,023 B2 | 5/2007 | Iwasa et al. | 362/555 |
| 7,228,253 B2 | 6/2007 | Chen | 318/11 |
| 7,237,924 B2 | 7/2007 | Martineau et al. | 362/231 |
| D556,358 S | 11/2007 | Santoro | D26/74 |
| 7,387,410 B2 | 6/2008 | Sibout | 362/375 |
| 7,510,299 B2 | 3/2009 | Timmermans et al. | 362/225 |
| D593,246 S | 5/2009 | Fowler et al. | D26/76 |
| 7,540,627 B2 | 6/2009 | Handsaker | |
| 7,559,672 B1 * | 7/2009 | Parkyn | A47B 97/00 362/127 |
| 7,594,736 B1 | 9/2009 | Kassay et al. | 362/223 |
| D604,446 S | 11/2009 | Fowler et al. | D26/76 |
| 7,618,160 B2 | 11/2009 | Chinniah et al. | 362/326 |
| 7,628,506 B2 | 12/2009 | Verfuerth et al. | 362/218 |
| D608,932 S | 1/2010 | Castelli | D26/76 |
| 7,654,702 B1 | 2/2010 | Ding et al. | 362/294 |
| 7,654,703 B2 | 2/2010 | Kan et al. | 362/362 |
| 7,661,844 B2 | 2/2010 | Sekiguchi et al. | 362/249 |
| D611,183 S | 3/2010 | Duarte | D26/76 |
| 7,674,005 B2 | 3/2010 | Chung | 362/147 |
| 7,686,484 B2 | 3/2010 | Heiking et al. | 362/375 |
| 7,712,918 B2 | 5/2010 | Siemiet et al. | 362/241 |
| 7,722,220 B2 | 5/2010 | Van de Ven | 362/294 |
| D617,487 S | 6/2010 | Fowler et al. | D26/76 |
| 7,758,207 B1 | 7/2010 | Zhou | 362/217.1 |
| 7,768,192 B2 | 8/2010 | Van de Ven et al. | 313/503 |
| 7,791,061 B2 | 9/2010 | Edmond et al. | |
| 7,815,338 B2 | 10/2010 | Siemiet et al. | 362/218 |
| D633,247 S | 2/2011 | Kong et al. | D26/88 |
| 7,988,335 B2 | 8/2011 | Liu et al. | 362/294 |
| 7,997,762 B2 | 8/2011 | Wang et al. | 362/249 |
| 8,058,088 B2 | 11/2011 | Cannon et al. | |
| 8,071,326 B2 | 12/2011 | Lee et al. | 362/307 |
| D653,376 S | 1/2012 | Kong et al. | D26/76 |
| 8,092,049 B2 | 1/2012 | Kinnune et al. | 362/294 |
| 8,201,968 B2 | 6/2012 | Maxik et al. | |
| 8,206,004 B2 | 6/2012 | Serak et al. | 362/217 |
| 8,220,953 B1 | 7/2012 | Moore | 362/217.01 |
| 8,313,212 B2 | 11/2012 | Mayer et al. | 362/219 |
| 8,317,369 B2 | 11/2012 | McCanless | 362/368 |
| 8,342,714 B1 | 1/2013 | Rea | 362/264 |
| 8,376,578 B2 | 2/2013 | Kong et al. | 362/241 |
| 8,388,180 B2 * | 3/2013 | Chang | F21V 5/00 362/217.04 |
| 8,459,824 B1 | 6/2013 | Esmailzadeh et al. | 362/147 |
| 8,480,252 B2 | 7/2013 | Bertram et al. | 362/243 |
| 8,506,135 B1 | 8/2013 | Oster | 362/373 |
| 8,523,383 B1 | 9/2013 | Grigore et al. | 362/221 |
| 8,678,611 B2 | 3/2014 | Chu | 313/110 |
| 8,714,770 B2 * | 5/2014 | Kato | F21V 5/04 362/217.06 |
| 8,764,220 B2 | 7/2014 | Chan et al. | 362/217.02 |
| 8,777,448 B2 | 7/2014 | Shimizu | 362/235 |
| 9,057,493 B2 | 6/2015 | Simon | |
| 2001/0048599 A1 | 12/2001 | Hess | 362/290 |
| 2004/0001344 A1 | 1/2004 | Hecht | 362/555 |
| 2004/0240214 A1 | 12/2004 | Whitlow et al. | 362/373 |
| 2004/0252521 A1 | 12/2004 | Clark | 362/554 |
| 2005/0041418 A1 | 2/2005 | Fan | 362/217.05 |
| 2005/0146867 A1 | 7/2005 | Kassay | 362/217.05 |
| 2005/0264716 A1 | 12/2005 | Kim et al. | |
| 2006/0050505 A1 | 3/2006 | McCarthy | 362/219 |
| 2006/0266955 A1 | 11/2006 | Arvin | 250/492.1 |
| 2006/0278882 A1 | 12/2006 | Leung | 257/98 |
| 2007/0109330 A1 | 5/2007 | Brown Elliott et al. | |
| 2007/0109779 A1 | 5/2007 | Sekiguchi et al. | |
| 2007/0115670 A1 | 5/2007 | Roberts et al. | |
| 2007/0115671 A1 | 5/2007 | Roberts et al. | |
| 2007/0158668 A1 | 7/2007 | Tarsa et al. | |
| 2007/0171647 A1 * | 7/2007 | Artwohl | A47F 3/001 362/276 |
| 2007/0211457 A1 | 9/2007 | Mayfield et al. | 362/223 |
| 2007/0253205 A1 | 11/2007 | Welker | 362/373 |
| 2008/0049422 A1 | 2/2008 | Trenchard et al. | |
| 2008/0128723 A1 | 6/2008 | Pang | |
| 2008/0173884 A1 | 7/2008 | Chitnis et al. | |
| 2008/0179611 A1 | 7/2008 | Chitnis et al. | |
| 2008/0232093 A1 | 9/2008 | Kim | |
| 2008/0258130 A1 | 10/2008 | Bergmann et al. | |
| 2008/0285267 A1 | 11/2008 | Santoro | 362/224 |
| 2008/0314944 A1 | 12/2008 | Tsai | 224/331 |
| 2009/0040782 A1 | 2/2009 | Liu et al. | 362/555 |
| 2009/0046457 A1 | 2/2009 | Everhart | 362/235 |
| 2009/0161356 A1 | 6/2009 | Negley et al. | 362/231 |
| 2009/0184333 A1 | 7/2009 | Wang et al. | |
| 2009/0185379 A1 * | 7/2009 | Chen | F21V 3/00 362/362 |
| 2009/0196024 A1 | 8/2009 | Heiking et al. | 362/150 |
| 2009/0207602 A1 | 8/2009 | Reed et al. | 362/225 |
| 2009/0212304 A1 | 8/2009 | Wang et al. | |
| 2009/0224265 A1 | 9/2009 | Wang et al. | |
| 2009/0225543 A1 | 9/2009 | Jacobson et al. | |
| 2009/0237958 A1 | 9/2009 | Kim | |

(56) References Cited

U.S. PATENT DOCUMENTS

| | | |
|---|---|---|
| 2009/0262543 A1 | 10/2009 | Ho .................... 362/373 |
| 2009/0290345 A1 | 11/2009 | Shaner ............. 362/244.01 |
| 2009/0290348 A1 | 11/2009 | Van Laanen et al. ..... 362/249 |
| 2009/0296381 A1 | 12/2009 | Dubord ................ 362/218 |
| 2009/0310354 A1 | 12/2009 | Zampini et al. ......... 362/235 |
| 2009/0323334 A1 | 12/2009 | Roberts et al. |
| 2010/0002426 A1 | 1/2010 | Wu .................... 362/223 |
| 2010/0014289 A1 | 1/2010 | Thomas ............... 352/235 |
| 2010/0097794 A1 | 4/2010 | Teng et al. ............ 362/231 |
| 2010/0110679 A1 | 5/2010 | Teng et al. |
| 2010/0110701 A1 | 5/2010 | Liu .................... 362/373 |
| 2010/0128485 A1 | 5/2010 | Teng .................. 362/294 |
| 2010/0142205 A1 | 6/2010 | Bishop ............. 362/249.02 |
| 2010/0155763 A1 | 6/2010 | Donofrio et al. |
| 2010/0171404 A1 | 7/2010 | Liu et al. ............... 313/46 |
| 2010/0172133 A1 | 7/2010 | Liu .................... 362/235 |
| 2010/0188609 A1 | 7/2010 | Matsuki et al. |
| 2010/0214770 A1 | 8/2010 | Anderson ............. 362/133 |
| 2010/0220469 A1 | 9/2010 | Ivey et al. ............. 362/218 |
| 2010/0254128 A1 | 10/2010 | Pickard et al. |
| 2010/0254145 A1 | 10/2010 | Yamaguchi |
| 2010/0254146 A1 | 10/2010 | McCanless |
| 2010/0259927 A1 | 10/2010 | Chien ................. 362/235 |
| 2010/0328945 A1 | 12/2010 | Song et al. ............ 362/240 |
| 2011/0006688 A1 | 1/2011 | Shim .................. 315/119 |
| 2011/0007514 A1 | 1/2011 | Sloan ................. 362/368 |
| 2011/0013400 A1 | 1/2011 | Kanno et al. |
| 2011/0028006 A1 | 2/2011 | Shah et al. ............. 439/39 |
| 2011/0032714 A1 | 2/2011 | Chang ................ 362/373 |
| 2011/0043132 A1 | 2/2011 | Kim et al. ............. 362/235 |
| 2011/0090671 A1 | 4/2011 | Bertram et al. ......... 362/84 |
| 2011/0090682 A1 | 4/2011 | Zheng ................ 362/218 |
| 2011/0103043 A1 | 5/2011 | Ago ................... 362/147 |
| 2011/0141734 A1 | 6/2011 | Li et al. ............... 362/235 |
| 2011/0156584 A1 | 6/2011 | Kim |
| 2011/0163683 A1 | 7/2011 | Steele et al. ........... 315/192 |
| 2011/0199005 A1 | 8/2011 | Bretschneider et al. |
| 2011/0199769 A1 | 8/2011 | Bretschneider et al. |
| 2011/0211330 A1 | 9/2011 | Wang .................. 362/20 |
| 2011/0285314 A1 | 11/2011 | Carney et al. .......... 315/294 |
| 2011/0286207 A1 | 11/2011 | Chan et al. ........... 362/217.1 |
| 2011/0286208 A1 | 11/2011 | Chen ................ 362/217.1 |
| 2011/0310604 A1 | 12/2011 | Shimizu ............... 362/235 |
| 2011/0310614 A1 | 12/2011 | Budike, Jr. ............. 362/294 |
| 2012/0002408 A1 | 1/2012 | Lichten et al. .......... 362/218 |
| 2012/0038289 A1 | 2/2012 | Jee et al. |
| 2012/0051041 A1 | 3/2012 | Edmond ............... 362/231 |
| 2012/0075857 A1 | 3/2012 | Verbrugh .............. 362/249 |
| 2012/0081883 A1 | 4/2012 | Wang .................. 362/101 |
| 2012/0092876 A1* | 4/2012 | Chang ................ F21V 5/00 362/326 |
| 2012/0098424 A1 | 4/2012 | Arik ................... 315/35 |
| 2012/0120666 A1 | 5/2012 | Moeller ............... 362/308 |
| 2012/0127714 A1 | 5/2012 | Rehn |
| 2012/0140461 A1 | 6/2012 | Pickard |
| 2012/0169234 A1 | 7/2012 | Shew ................... 315/88 |
| 2012/0182755 A1 | 7/2012 | Wildner ............... 362/555 |
| 2012/0218757 A1 | 8/2012 | Gill ................... 362/235 |
| 2012/0235199 A1 | 9/2012 | Andrews et al. |
| 2012/0250302 A1 | 10/2012 | Edwards .............. 362/223 |
| 2013/0039090 A1 | 2/2013 | Dau ................... 362/551 |
| 2013/0050998 A1 | 2/2013 | Chu et al. ............. 362/218 |
| 2013/0093359 A1* | 4/2013 | Hsu ................. F21V 19/003 315/312 |
| 2013/0094225 A1 | 4/2013 | Leichner .............. 362/368 |
| 2013/0155670 A1 | 6/2013 | Handsaker ............ 362/147 |
| 2013/0242548 A1 | 9/2013 | Ter-Hovhannisyan |
| 2013/0258616 A1 | 10/2013 | Chao .................. 361/752 |
| 2013/0271979 A1 | 10/2013 | Pearson et al. ......... 362/235 |
| 2013/0279156 A1 | 10/2013 | Kaule ................. 362/133 |
| 2013/0279180 A1 | 10/2013 | Pearson et al. ......... 362/371 |
| 2013/0329425 A1 | 12/2013 | Lowes et al. |
| 2014/0085861 A1 | 3/2014 | Nicolai ................ 362/84 |
| 2014/0265809 A1 | 9/2014 | Hussell |
| 2015/0016100 A1 | 1/2015 | Ishii .................. 362/752 |
| 2015/0022999 A1* | 1/2015 | Yu ................... F21K 9/90 362/84 |

FOREIGN PATENT DOCUMENTS

| | | |
|---|---|---|
| CN | 202580962 | 12/2012 |
| DE | 102007030186 | 1/2009 |
| DE | 202010001832 | 7/2010 |
| EP | 1298383 A2 | 4/2003 |
| EP | 1357335 A2 | 10/2003 |
| EP | 1653254 | 5/2006 |
| EP | 1737051 | 12/2006 |
| EP | 1847762 A2 | 10/2007 |
| EP | 1860467 | 11/2007 |
| JP | 2002244027 | 11/2002 |
| JP | U3097327 | 8/2003 |
| JP | 2004140327 | 5/2004 |
| JP | 2009295577 | 12/2009 |
| JP | 2010103687 | 5/2010 |
| JP | 2011018571 | 8/2011 |
| JP | 2011018572 | 8/2011 |
| KR | 20100012997 | 12/2010 |
| WO | WO03102467 | 11/2003 |
| WO | WO2008003289 | 1/2008 |
| WO | WO2009140761 A1 | 11/2009 |
| WO | WO2009157999 A1 | 12/2009 |
| WO | WO2010042216 A2 | 4/2010 |
| WO | WO2011074424 A1 | 6/2011 |
| WO | WO2011096098 A1 | 8/2011 |
| WO | WO2011098191 | 8/2011 |
| WO | WO2011118991 A2 | 9/2011 |
| WO | WO2011140353 A2 | 11/2011 |

OTHER PUBLICATIONS

Office Action from U.S. Appl. No. 13/464,745, dated Feb. 12, 2014.
Office Action from U.S. Appl. No. 13/453,924, dated Feb. 19, 2014.
Office Action from U.S. Appl. No. 13/341,741, dated Jan. 14, 2014.
Office Action from U.S. Appl. No. 13/370,252, dated Dec. 20, 2013.
Office Action from U.S. Appl. No. 29/387,171, dated May 2, 2012.
Response to OA from U.S. Appl No. 29/387.171, dated Aug. 2, 2012.
Office Action from U.S. Appl. No 12/961,385, dated Apr. 26, 2013.
Response to OA from U.S. Appl. No. 12/961,385, dated Jul. 24, 2013.
Office Action from U.S. Appl. No. 13/464,745, dated Jul. 16, 2013.
Office Action from U.S. Appl. No. 29/368,970, dated Jun. 19, 2012.
Office Action from U.S. Appl. No. 29/368,970, dated Aug. 24, 2012.
Response to OA from U.S. Appl. No. 29/368,970, dated Nov. 26, 2012.
Office Action from U.S. Appl. No. 12/961,385, dated Nov. 6, 2013.
Preliminary Report and Written Opinion from PCT appl. No. PCT/US2012/047084, dated Feb. 6, 2014.
Office Action from U.S. Appl. No. 13/429,080, dated Apr. 18, 2014.
Office Action from U.S. Appl. No. 12/961,385, dated Mar. 11, 2014.
Reasons for Rejection from Japanese Patent Appl. No, 2013-543207, dated May 20, 2014.
First Office Action from Chinese Patent Appl. No. 2011800529984, dated May 4, 2014.
Office Action from U.S. Appl. No. 13/544,662, dated May 5, 2014.
Office Action from U.S. Appl. No. 13/844,431, dated May 15, 2014.
Office Action from U.S. Appl. No. 13/341,741, dated Jun. 6, 2014.
Office Action from U.S. Appl. No. 29/449,316, dated Jun. 5, 2014.
Office Action from U.S. Appl. No. 13/842,150, dated Jun. 18, 2014.
Leviton LED Magnetic Tube Retrofit Series datasheet. 1 page, from www.leviton.com.
Restriction Requirement from U.S. Appl. No. 13/839,130, dated Jul. 28, 2014.
Office Action from U.S. Appl. No. 13/839,130, dated Sep. 25, 2014.
Office Action from U.S. Appl. No. 13/829,558, dated Sep. 30, 2014.
Office Action from U.S. Appl. No. 29/450,283, dated Nov. 5, 2014.
Office Action from U.S. Appl. No. 29/449,316, dated Nov. 26, 2014.
Office Action from U.S. Appl. No. 13/840,812, dated Nov. 28, 2014.

(56) References Cited

OTHER PUBLICATIONS

Office Action from U.S. Appl. No. 13/763,270, dated Oct. 3, 2014.
Office Action from U.S. Appl. No. 13/672,592, dated Jan. 7, 2015.
Office Action from U.S. Appl. No. 13/899,314, dated Jan. 15, 2015.
Office Action from U.S. Appl. No. 13/842,150, dated Jan. 22, 2015.
Office Action from U.S. Appl. No. 13/829,558, dated Mar. 9, 2015.
Office Action from U.S. Appl. No. 13/958,462, dated Mar. 10, 2015.
Office Action from U.S. Appl. No. 13/834,605, dated Apr. 9, 2015.
Office Action from U.S. Appl. No. 13/840,812, dated May 12, 2015.
Office Action from U.S. Appl. No. 13/910,486, dated May 7, 2015.
Office Action from U.S. Appl. No. 13/763,270, dated May 19, 2015.
Office Action from U.S. Appl. No. 13/899,314, dated Jul. 29, 2015.
Response to OA from U.S. Appl. No 13/899,314, dated Sep. 15, 2015.
Office Action from U.S. Appl. No. 13/672,592, dated Aug. 6, 2015.
Response to OA from U.S. Appl. No. 13/672,592, dated Sep. 21, 2015.
Office Action from U.S. Appl. No. 13/842,150, dated Aug. 10, 2015.
Office Action from U.S. Appl. No. 13/829,558, dated Sep. 11, 2015.
International Search Report and Written Opinion from PCT/US2013/049225, dated Oct. 24, 2013.
International Search Report and Written Opinion from PCT Application No. PCT/US2013/021053, dated Apr. 17, 2013.
U.S. Appl. No. 12/074,762, filed Mar, 2008, Jacobson, et al.
U.S. Appl. No. 13/442,311, filed Apr. 2012, Lu, et al.
U.S. Appl. No. 13/763,270, filed Feb. 2010, Heeter, et al.
Citadel(tm) SLP Lighting (http://www.slplighting.com/enclosures.html).
Final Rejection issued in Korean Design Appl. No. 30-2011-0038114, dated Jun. 14, 2013.
Final Rejection issued in Korean Design Appl. No. 30-2011-0038115, dated Jun. 14, 2013.
Final Rejection issued in Korean Design Appl. No. 30-2011-0038116, dated Jun. 17, 2013.
International Search Report and Written Opinion from PCT Patent Appl. No. PCT/US2013/035668, dated Jul. 12, 2013.
Notice to Submit a Response from Korean Patent Application No. 30-2011-0038115, dated Dec. 12, 2012.
Notice to Submit a Response from Korean Patent Application No. 30-2011-0038116, dated Dec. 12, 2012.
International Search Report and Written Opinion for PCT Application No. PCT/US2011/062396, dated Jul. 13, 2012.
U.S. Appl. No. 12/873,303, filed Aug. 31, 2010 to Edmond, et al.
U.S. Appl. No. 12/961,385, filed Dec. 6, 2010 to Pickard, et al.
Cree's XLamp XP-E LED's, data sheet, pp. 1-17.
Cree's XLamp XP-G LED's, data sheet, pp. 1-12.
Search Report and Written Opinion from PCT Patent Appl. No. PCT/US2012/047084, dated Feb. 27, 2013.
Search Report and Written Opinion from PCT Patent Appl. No. PCT/US2012/071800, dated Mar. 25, 2013.
Office Action from Japanese Design Patent Application No. 2011-18570.
Reason for Rejection from Japanese Design Patent Application No. 2011-18571.
Reason for Rejection from Japanese Design Patent Application No. 2011-18572.
Cree® XLamp® XQ-B LED. Product Family Data Sheet, www.cree.com/xlamp, 10 pages.
U.S. Appl. No. 13/649,052, filed Oct. 10, 2012, Lowes, et al.
U.S. Appl. No. 13/649,067, filed Oct. 10, 2012, Lowes, et al.
U.S. Appl. No. 13/207,204, filed Aug. 10, 2011, Åthalya, et al.
U.S. Appl. No. 13/365,844.
U.S. Appl. No. 13/662,618, filed Oct. 29, 2012, Åthalye, et al.
U.S. Appl. No. 13/462,388, filed May 2, 2012.
U.S. Appl. No. 13/842,150, filed Mar. 15, 2013, Dixon, et al.
U.S. Appl. No. 13/770,389, filed Feb. 19, 2013, Lowes, et al.
U.S. Appl. No. 13/782,820, filed Mar. 1, 2013, Dixon, et al.
XLamp® C family from Cree®, Inc., Product Family Data Sheet. 15 pages.
XLamp® M family from Cree®, Inc., Product Family Data Sheet, 14 pages.
XLamp® X family from Cree®, Inc., Product Family Data Sheet. 17 pages.
Energy Star® Program Requirements for Solid State Lighting Luminaires, Eligibility Criteria—Version 1.1. final: Dec. 19, 2008.
Assist Recommends . . . LED Life for General Lighting: Definition of Life, vol. 1. Issue 1. Feb. 2005.
"IES Approved Method for Measuring Lumen Maintenance of LED light Sources", Sep. 22, 2008, ISBN No. 978-0-87995-227-3.
International Search Report and Written Opinion for Patent Application No. PCT/US2011/001517, dated: Feb. 27, 2012.
U.S. Appl. No. 12/418,796, filed Apr. 6, 2009.
U.S. Appl. No. 13/429,080, filed Mar. 23, 2012.
U.S. Appl. No. 13/028,946, filed Feb. 16, 2011.
U.S. Appl. No. 13/306,589, filed Nov. 29, 2011.
Office Action from U.S. Appl. No. 14/252,685, dated Oct. 1, 2015.
Office Action from U.S. Appl. No. 13/956,461, dated Oct. 15, 2015.
Office Action from U.S. Appl. No. 13/910,486, dated Oct. 15, 2015.
Response to OA from U.S. Appl. No. 13/910,466, dated Dec. 15, 2015.
Office Action from U.S. Appl. No. 13/782,820, dated Oct. 30, 2015.
Office Action from U.S. Appl. No. 13/899,314, dated Nov. 13, 2015.
Response to OA from U.S. Appl. No. 13/899,314, dated Dec. 16, 2015.
Office Action from U.S. Appl. No. 13/672,592, dated Nov. 23, 2015.
Office Action from U.S. Appl. No. 14/108,168; dated Dec. 24, 2015.
Office Action from U.S. Appl. No. 13/842,150; dated Dec. 30, 2015.
Office Action from U.S. Appl. No. 13/763,270; dated Jan. 12, 2016.
Office Action from U.S. Appl. No. 13/899,314; dated Feb. 4, 2116.
Office Action from U.S. Appl. No. 14/070,098; dated Feb. 5, 2016.
Office Action from U.S. Appl. No. 13/829,558; dated Feb. 19, 2016.
Office Action from U.S. Appl. No. 13/910,486; dated Mar. 1, 2016.
Office Action from U.S. Appl. No. 14/108,168; dated May 20, 2016.
Office Action from U.S. Appl. No. 14/252,685; dated May 20, 2016.
Office Action from U.S. Appl. No. 13/829,558; dated Aug. 16, 2016.
Office Action from U.S. Appl. No. 14/070,098; dated Sep. 9, 2016.
Office Action for U.S. Appl. No. 13/958,461; dated Jun. 17, 2016.
Office Action for U.S. Appl. No. 13/910,486; dated Jun. 23, 2016.
Office Action for U.S. Appl. No. 13/763,276 dated Jul. 15, 2016.
Office Action for U.S. Appl. No. 14/108,168; dated Nov. 15, 2016.
Office Action for U.S. Appl. No. 13/910,486; dated Dec. 14, 2016.
Chinese Office Action Application No. 201310236572; dated Jan. 4, 2017.

* cited by examiner

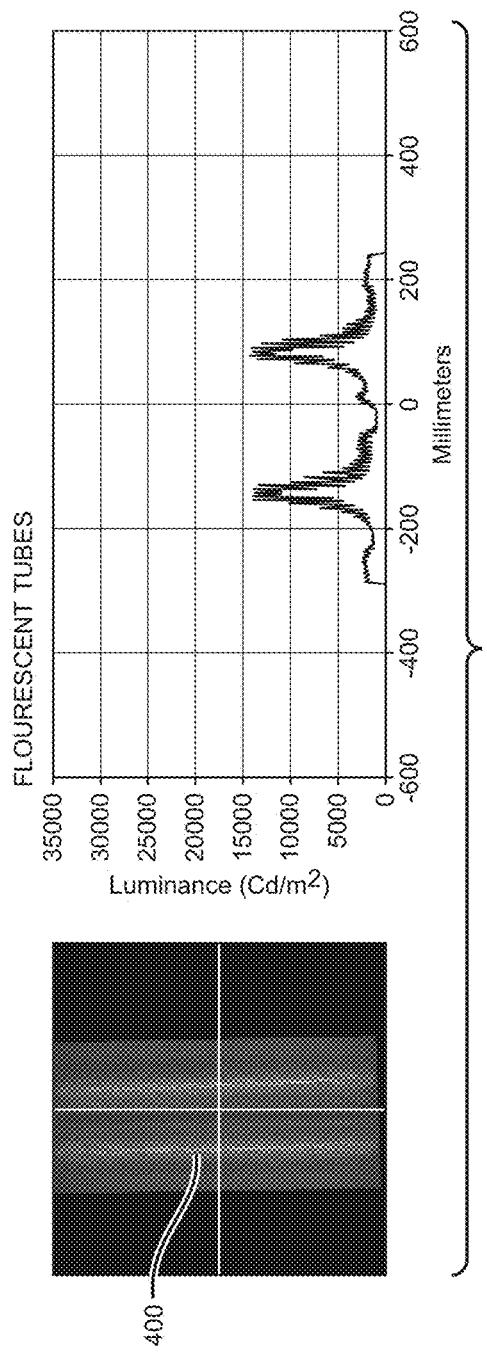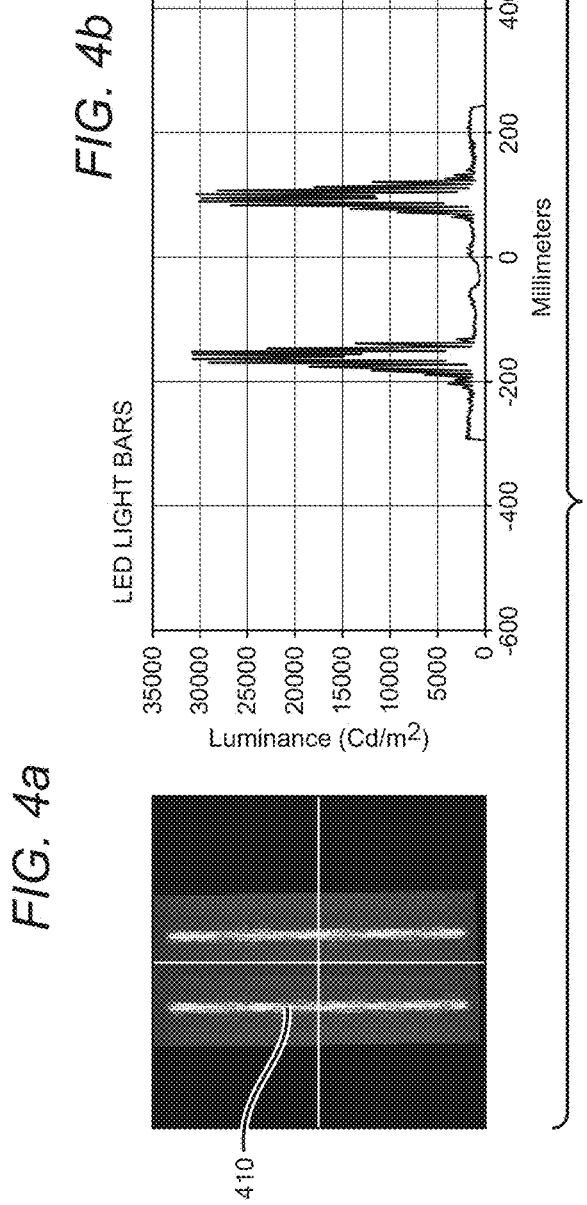
FIG. 4a
FIG. 4b

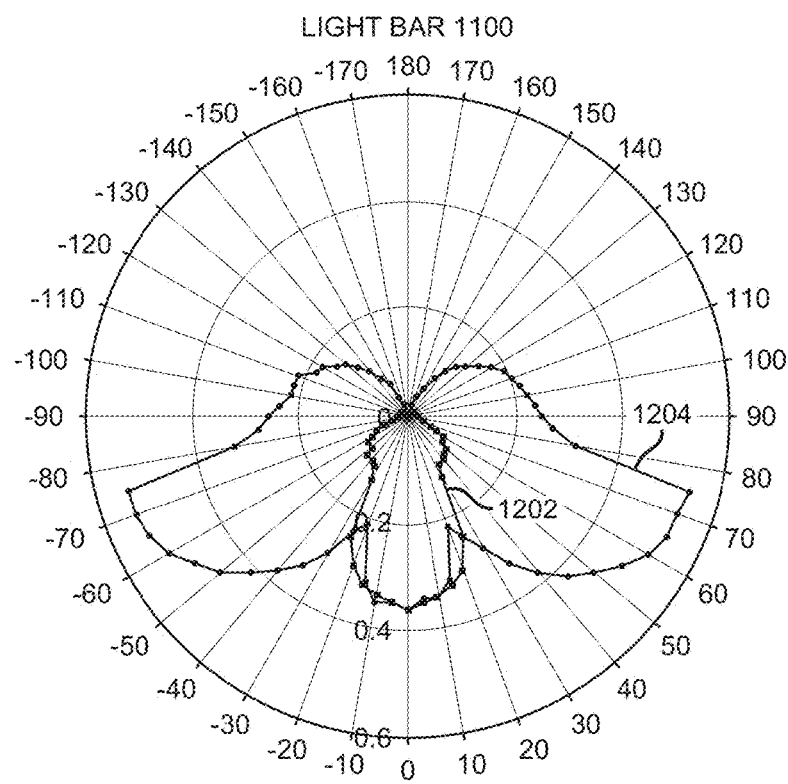
FIG. 12a
FIG. 13
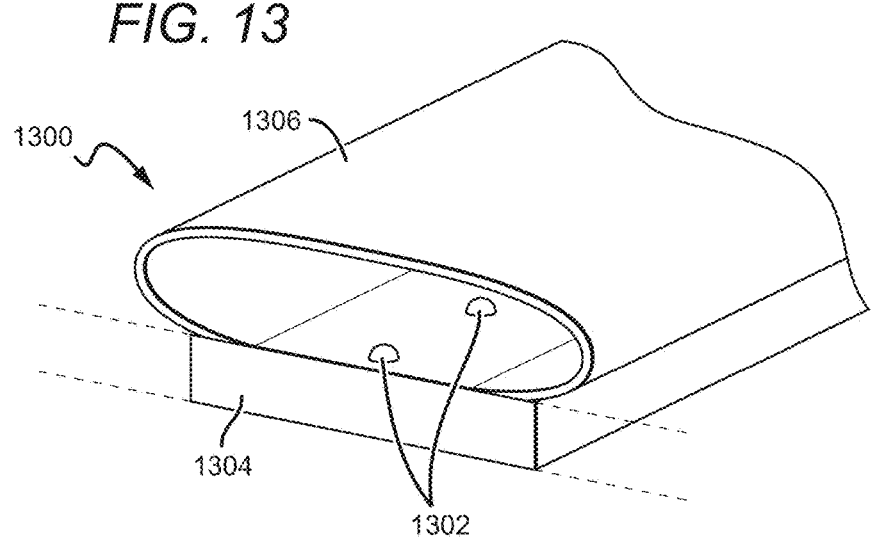

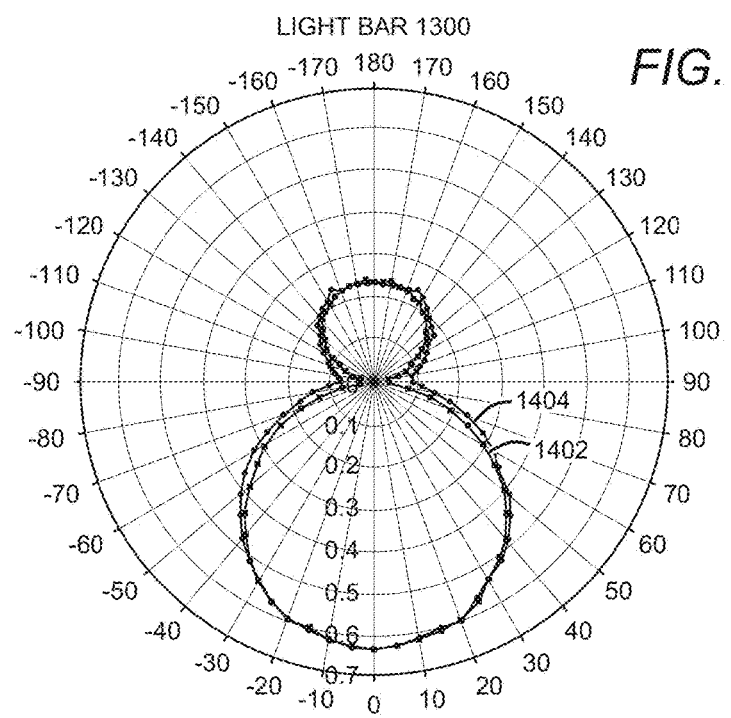
FIG. 14
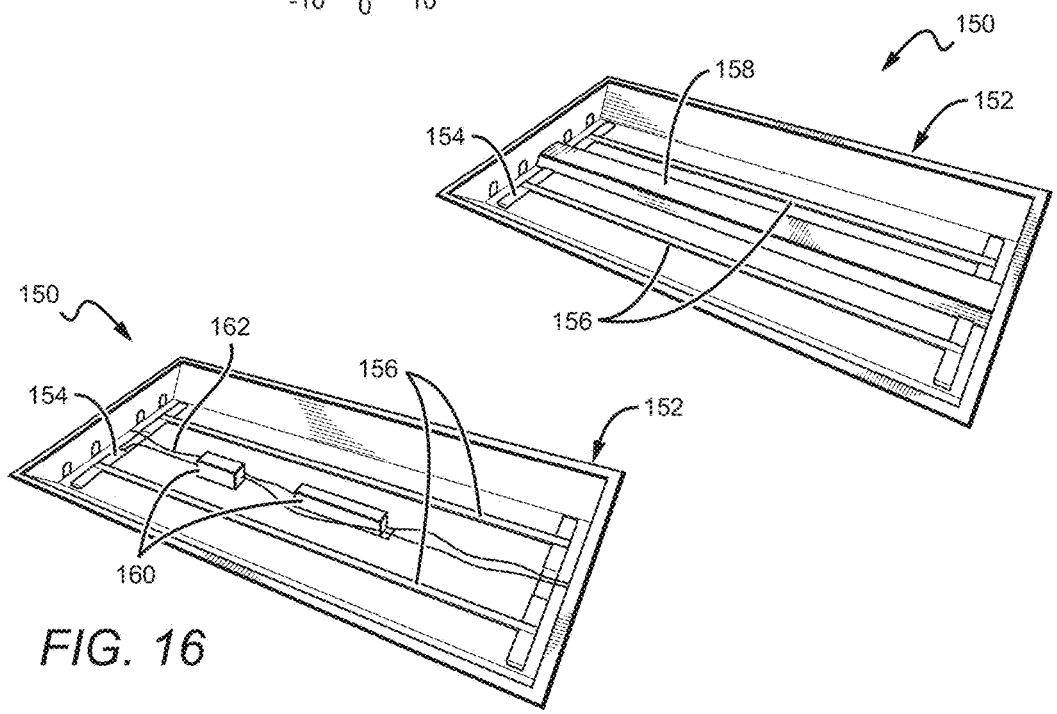
FIG. 15
FIG. 16

LED RETROFIT LENS FOR FLUORESCENT TUBE

RELATED APPLICATIONS

This application is a continuation-in-part of U.S. patent application Ser. No. 12/961,385 filed on 6 Dec. 2010. This application is also a continuation-in-part of U.S. patent application Ser. No. 13/763,270 filed on 8 Feb. 2013. All applications referred to in this paragraph are hereby incorporated by reference as if set forth fully herein.

BACKGROUND OF THE INVENTION

Field of the Invention

Embodiments of the invention relate to lenses for lighting applications and, more particularly, to linear lenses designed to retrofit systems built for fluorescent tube lights.

Description of the Related Art

Troffer-style fixtures are ubiquitous in commercial office and industrial spaces throughout the world. In many instances these troffers house elongated tubular fluorescent lamps or light bulbs that span the length of the troffer. Troffers may be mounted to or suspended from ceilings, such as being suspended by a "T-grid". Often the troffer may be recessed into the ceiling, with the back side of the troffer protruding into the plenum area above the ceiling. Typically, elements of the troffer on the back side dissipate heat generated by the light source into the plenum where air can be circulated to facilitate the cooling mechanism. U.S. Pat. No. 5,823,663 to Bell, et al. and U.S. Pat. No. 6,210,025 to Schmidt, et al. are examples of typical troffer-style fixtures.

More recently, with the advent of the efficient solid state lighting sources, these troffers have been used with LEDs as their light source. LEDs are solid state devices that convert electric energy to light and generally comprise one or more active regions of semiconductor material interposed between oppositely doped semiconductor layers. When a bias is applied across the doped layers, holes and electrons are injected into the active region where they recombine to generate light. Light is produced in the active region and emitted from surfaces of the LED.

LEDs have certain characteristics that make them desirable for many lighting applications that were previously the realm of incandescent or fluorescent lights. Incandescent lights are very energy-inefficient light sources with approximately ninety percent of the electricity they consume being released as heat rather than light. Fluorescent light bulbs are more energy efficient than incandescent light bulbs by a factor of about 10, but are still relatively inefficient. LEDs by contrast, can emit the same luminous flux as incandescent and fluorescent lights using a fraction of the energy.

In addition, LEDs can have a significantly longer operational lifetime. Incandescent light bulbs have relatively short lifetimes, with some having a lifetime in the range of about 750-1000 hours. Fluorescent bulbs can also have lifetimes longer than incandescent bulbs such as in the range of approximately 10,000-20,000 hours, but provide less desirable color reproduction. In comparison, LEDs can have lifetimes between 50,000 and 70,000 hours. The increased efficiency and extended lifetime of LEDs is attractive to many lighting suppliers and has resulted in their LED lights being used in place of conventional lighting in many different applications. It is predicted that further improvements will result in their general acceptance in more and more lighting applications. An increase in the adoption of LEDs in place of incandescent or fluorescent lighting would result in increased lighting efficiency and significant energy saving.

There has been recent interest in upgrading existing troffer style lighting systems with LED sources (or engines) to capitalize on the above advantages. Current options for upgrading include complete fixture replacement such as by the commercially available CR Series Architectural LED Troffer, provided by Cree, Inc. Some features of these troffers are described in U.S. patent application Ser. No. 12/873,303, titled "Troffer-style Fixture", and assigned to Cree, Inc. Performing complete fixture replacement can require penetrating the ceiling plenum by a skilled technician. This can be time consuming and expensive, and in many locations, building codes can require that a licensed electrician perform any work in the plenum space above a ceiling.

Some troffer-style fixtures utilize arrays of LEDs, to achieve a particular light output profile. Arrayed LED designs have become popular due to economies of size and efficiency. Lighting applications may include linear arrays, two-dimensional arrays, and even three-dimensional arrays. U.S. application Ser. No. 12/074,762, commonly assigned to CREE, INC., provides examples of some of these emitter arrays.

Emitter arrays have been used in lighting fixtures. U.S. application Ser. No. 12/873,303, commonly assigned to CREE, INC., discloses, inter alia, solid state emitter arrays used in troffer-style fixtures. Troffer-style fixtures are ubiquitous in commercial office and industrial spaces throughout the world. In many instances these troffers house elongated fluorescent light bulbs that span the length of the troffer. Troffers may be mounted to or suspended from ceilings. Often the troffer may be recessed into the ceiling, with the back side of the troffer protruding into the plenum area above the ceiling. Typically, elements of the troffer on the back side dissipate heat generated by the light source into the plenum where air can be circulated to facilitate the cooling mechanism. U.S. Pat. No. 5,823,663 to Bell, et al. and U.S. Pat. No. 6,210,025 to Schmidt, et al., are examples of typical troffer-style fixtures.

Other LED components or lamps have been developed that comprise an array of multiple LED packages mounted to a (PCB), substrate or submount. The array of LED packages can comprise groups of LED packages emitting different colors, and specular reflector systems to reflect light emitted by the LED chips. Some of these LED components are arranged to produce a white light combination of the light emitted by the different LED chips.

In order to generate a desired output color, it is sometimes necessary to mix colors of light which are more easily produced using common semiconductor systems. Of particular interest is the generation of white light for use in everyday lighting applications. Conventional LEDs cannot generate white light from their active layers; it must be produced from a combination of other colors. For example, blue emitting LEDs have been used to generate white light by surrounding the blue LED with a yellow phosphor, polymer or dye, with a typical phosphor being cerium-doped yttrium aluminum garnet (Ce:YAG). The surrounding phosphor material "downconverts" some of the blue light, changing it to yellow light. Some of the blue light passes through the phosphor without being changed while a substantial portion of the light is downconverted to yellow. The LED emits both blue and yellow light, which combine to yield white light.

In another known approach, light from a violet or ultraviolet emitting LED has been converted to white light by surrounding the LED with multicolor phosphors or dyes. Indeed, many other color combinations have been used to generate white light.

Because of the physical arrangement of the various source elements, multicolor sources often cast shadows with color separation and provide an output with poor color uniformity. For example, a source featuring blue and yellow emitters may appear to have a blue tint when viewed head on and a yellow tint when viewed from the side. Thus, one challenge associated with multicolor light sources is good spatial color mixing over the entire range of viewing angles. One known approach to the problem of color mixing is to use a diffuser to scatter light from the various sources.

Another known method to improve color mixing is to reflect or bounce the light off of several surfaces before it is emitted from the lamp. This has the effect of disassociating the emitted light from its initial emission angle. Uniformity typically improves with an increasing number of bounces, but each bounce has an associated optical loss. Some applications use intermediate diffusion mechanisms (e.g., formed diffusers and textured lenses) to mix the various colors of light. Many of these devices are lossy and, thus, improve the color uniformity at the expense of the optical efficiency of the device.

Many current luminaire designs utilize forward-facing LED components with a specular reflector disposed behind the LEDs. One design challenge associated with multi-source luminaires is blending the light from LED sources within the luminaire so that the individual sources are not visible to an observer. Diffusive elements are also used to mix the color spectra from the various sources to achieve a uniform output color profile. To blend the sources and aid in color mixing, diffusive exit windows have been used.

There has been recent interest in upgrading existing troffer-style lighting systems with LED sources (or engines) to capitalize on advantages discussed above. Current options for upgrading include complete fixture replacement such as by the commercially available CR Series Architectural LED Troffer, provided by Cree, Inc. Some features of these troffers are described in U.S. patent application Ser. No. 12/873,303, titled "Troffer-style Fixture", and assigned to Cree, Inc. Performing complete fixture replacement can require penetrating the ceiling plenum by a skilled technician. This can be time consuming and expensive, and in many locations, building codes can require that a licensed electrician perform any work in the plenum space above a ceiling.

SUMMARY OF THE INVENTION

A lens according to the present invention comprises the following elements. An elongated body runs along a longitudinal axis, the body comprising at least one light entry surface, at least one exit surface, and at least one mount surface defining a mounting plane. The body is shaped to redirect at least some light that impinges the light entry surface in a direction away from a normal axis that is perpendicular to the mounting plane.

A light bar according to the present invention comprises the following elements. An elongated reflective base runs along a longitudinal axis and defines a normal axis perpendicular to the base. At least one light emitter is on the base. An elongated lens on the base such that light from the at least one light emitter impinges on the lens, the lens shaped to redirect at least some light from the at least one emitter away from the normal axis.

A light fixture according to the present invention comprises the following elements. At least one light bar attached to a fixture housing, each of the light bars comprising: an elongated reflective base running along a longitudinal axis and defining a normal axis perpendicular to the base; at least one light emitter on the base; and an elongated lens on the base such that light from the at least one light emitter impinges on the lens, the lens shaped to redirect at least some light from the at least one emitter away from the normal axis. A control circuit is included to control the at least one light emitter.

BRIEF DESCRIPTION OF THE DRAWINGS

FIGS. 4a and 4b include a false color image graph from the normal direction (z-axis) view juxtaposed with a data plot showing luminance ($Cd/m^2$) versus transverse position (x-position in mm) across the faces of two different lensed troffer-style fixtures (2×4 ft).

FIGS. 12a and 12b are polar graphs of the radiant intensity (W/sr) over the entire range of viewing angles of the light bar in FIG. 11.

FIG. 13 is a perspective cutaway view of a light bar according to an embodiment of the present invention.

FIG. 14 is a polar graph of the radiant intensity (W/sr) over the entire range of viewing angles of the light bar in FIG. 13.

FIG. 15 is a perspective view of a light fixture according to an embodiment of the present invention.

FIG. 16 is a perspective view of the fixture in FIG. 15 with the raceway cover removed to reveal the components of the power supply underneath.

DETAILED DESCRIPTION OF THE INVENTION

Figure 1A:
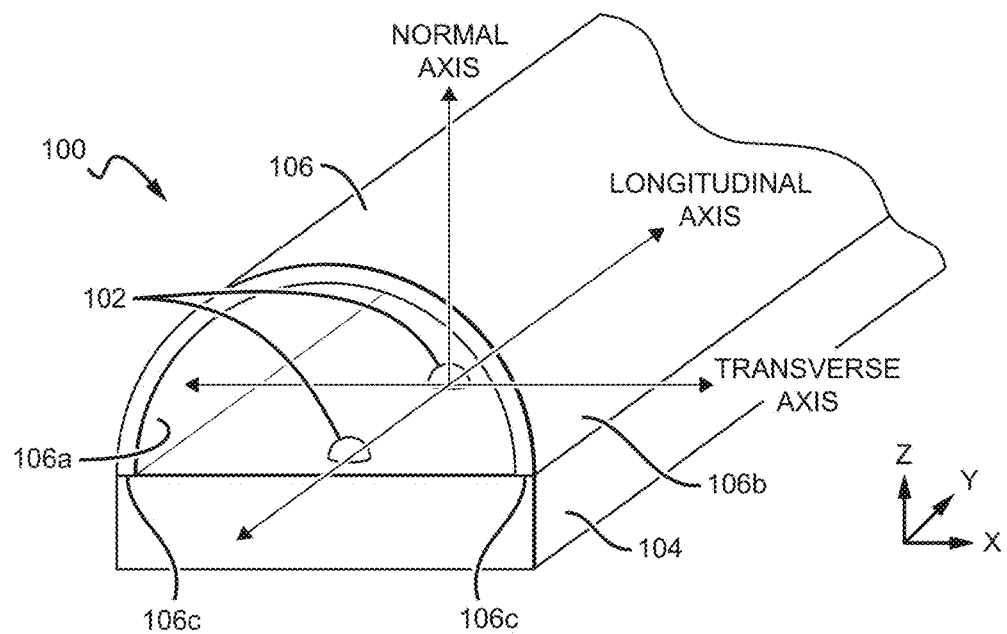
FIG. 1a is a perspective cutaway view of a light bar according to an embodiment of the present invention.

Embodiments of the present invention provide light fixtures having retrofit lenses and individual light bar elements for use therein. In order to mimic the size and appearance of fluorescent bulbs in existing troffer-style fixtures, LEDs are may be arranged on light bars with integrated lenses to both diffuse the light and shape the output beam. One or more LEDs can be mounted, sometimes in clusters, along the length of a base of the light bar which can then be inserted into a fixture. An elongated lens is mounted to the base over the LEDs so that light emitted from the LEDs interacts with the lens before it escapes the fixture. These elongated lenses may be extruded from a diffusive material and can be shaped in various ways. For example, the lenses may be shaped to disperse more light to the sides, i.e., in a direction away from a normal axis that is perpendicular to the base.

Embodiments of the present invention may be used in light fixtures and in retrofit systems for various different light applications, but that are particularly adapted for use with troffer-style and surface-mount type fixtures. These systems can provide the same amount of light as traditional light fixtures, for example 1600-4000 lumens and above. The systems can be also used with many different light sources but are particularly well-suited for use with solid state light sources or light engines, such as those utilizing LEDs. The LED light engines can have an elongated form, similar to fluorescent light sources, and can comprise a generally linear array of LEDs. These LED light engines can be referred to herein as a "light source bar" or "light bar." Some embodiments of the present invention comprise a mechanical mounting system for installing an LED light engine within an existing lighting system housing or pan, such as a troffer pan, without penetrating the ceiling plenum.

By leaving the existing troffer pan in place, embodiments of the present invention can rely on the troffer pan to act as a barrier against the spread of fire and smoke. In many areas, local codes may not allow for the use of plastic components inside the plenum space above the ceiling. This is due to concerns that if a fire occurred in one room, toxic smoke from burning plastics could be carried to other locations which share the air plenum. Maintaining the host fixture troffer pan as a barrier to this spread of toxic smoke can allow for the use of lower cost plastic parts above the ceiling plane in the troffer pan. Without the troffer pan barrier, these plastic parts might otherwise not be allowed in the plenum space.

During the upgrade process, contamination may also be a concern, particularly in a hospital or clean room environment. In upgrade processes where the entire fixture is replaced, the sheet metal pan or housing of an existing troffer lighting system is removed. Removing the host fixture pan can generate dust which must be contained, and the surrounding area must be cleaned prior to resuming normal operations within the environment. Preventing dust is of particular concern in the case of dust containing dangerous materials such as asbestos. In certain environments, construction permits may be required for an upgrade process that requires removal of the troffer pan, which can add additional complications and costs.

Another alternative upgrade option is by a fixture retrofit where a new LED based light engine or light bar can be installed into the sheet metal pan of an existing troffer lighting system. This can provide the advantage of using light bars with design features optimized for an LED-based system including reflectors, lenses, prismatic elements, and power supplies, such as those discussed herein. This approach also allows light bars which are approved for use in other applications to be used in a retrofit application. Some retrofits advantageously eliminate the need to remove the existing troffer pan, with the pan acting as a barrier to the plenum space. Leaving the pan intact during the retrofit process does not disturb wiring connections, insulation, etc., found in the plenum space and may also allow for work to be performed by non-licensed personnel, which can result in a significant cost savings over work performed by licensed electricians.

The present invention is described herein with reference to certain embodiments, but it is understood that the invention can be embodied in many different forms and should not be construed as limited to the embodiments set forth herein. In particular, the present invention is described below in regards to certain troffer-style and surface-mount type fixtures and retrofit systems that can be used to retrofit these fixtures, but it is understood that elements of the embodiments described can be used in other systems and also to retrofit and/or upgrade different types of lighting systems. The systems can also be used with many different light systems, sources and engines beyond those described herein, with many being LED-based.

It is understood that when an element is referred to as being "on" another element, it can be directly on the other element or intervening elements may also be present. Furthermore, relative terms such as "inner", "outer", "upper", "above", "lower", "beneath", and "below", and similar terms, may be used herein to describe a relationship of one element to another. It is understood that these terms are intended to encompass different orientations of the device in addition to the orientation depicted in the figures.

Although the ordinal terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present invention.

As used herein, the term "emitter" can be used to indicate a single light source or more than one light source functioning as a single emitter. For example, the term may be used to describe a single blue LED, or it may be used to describe a red LED and a green LED in proximity emitting as a single source. Additionally, the term "emitter" may indicate a single LED chip or multiple LED chips arranged in an array, for example. Thus, the terms "source" and "emitter" should not be construed as a limitation indicating either a single-element or a multi-element configuration unless clearly stated otherwise. Indeed, in many instances the terms "source" and "emitter" may be used interchangeably. It is also understood that an emitter may be any device that emits light, including but not limited to LEDs, vertical-cavity surface-emitting lasers (VCSELs), and the like.

The term "color" as used herein with reference to light is meant to describe light having a characteristic average wavelength; it is not meant to limit the light to a single wavelength. Thus, light of a particular color (e.g., green, red, blue, yellow, etc.) includes a range of wavelengths that are grouped around a particular average wavelength.

Embodiments of the present invention are described herein with reference to conversion materials, wavelength conversion materials, phosphors, phosphor layers and related terms. The use of these terms should not be construed as limiting. It is understood that the use of the term phosphor, or phosphor layers is meant to encompass and be equally applicable to all wavelength conversion materials.

Embodiments of the invention are described herein with reference to cross-sectional and/or cutaway views that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the invention.

FIG. 1a is a perspective cutaway view of a light bar 100 according to an embodiment of the present invention. The light bar 100 comprises a plurality of light emitters (e.g., LEDs) 102 mounted on an elongated reflective base 104 along a longitudinal axis (y-axis). Here, the emitters 102 are mounted in the center of the base 104; although, in other embodiments emitters can be mounted at other positions on the base along the transverse axis (x-axis). An elongated lens 106 is mounted over the emitters 102 on the base 104 such that light emitted from the emitters 102 impinges on the lens 106 prior to escaping the light bar 100. In this particular embodiment, because the emitters 102 are mounted in the center of the base 104 and the lens 106 is defined by a hemispherical cross-section, the light from the emitters 102 is emitted nearly uniformly in all directions from the lens 106. In other embodiments, some of which are discussed in detail herein, lenses may be shaped to redirect light in other directions to yield a desired output profile. Similarly as all of the lenses disclosed herein, the lens 106 comprises a light entry surface 106a, an exit surface 106b, and mount surfaces 106c.

Many industrial, commercial, and residential applications call for white light sources. The light bar 100 may comprise one or more emitters (e.g., LEDs) producing the same color of light or different colors of light. In one embodiment, a multicolor source is used to produce white light. Several colored light combinations will yield white light. For example, as discussed in U.S. Pat. Nos. 7,213,940 and 7,768,192, both of which are assigned to Cree, Inc., and both of which are incorporated herein by reference, it is known in the art to combine light from a blue LED with wavelength-converted yellow light to yield white light with correlated color temperature (CCT) in the range between 5000K to 7000K (often designated as "cool white"). Both blue and yellow light can be generated with a blue emitter by surrounding the emitter with phosphors that are optically responsive to the blue light. When excited, the phosphors emit yellow light which then combines with the blue light to make white.

Another example of generating white light with a multi-color source is combining the light from green and red LEDs. RGB schemes may also be used to generate various colors of light. In some applications, an amber emitter is added for an RGBA combination. The previous combinations are exemplary; it is understood that many different color combinations may be used in embodiments of the present invention. Several of these possible color combinations are discussed in detail in U.S. Pat. No. 7,213,940 to Van de Ven et al.

The light bar 100 may include the lighting arrangements 200, 220, 240 each of which represent possible LED combinations that result in an output spectrum that can be mixed to generate white light. Each light bar can include the electronics and interconnections necessary to power the emitters. In some embodiments the light bar comprises a printed circuit board with the emitters mounted and interconnected thereon.

The lighting arrangement 200 includes clusters 202 of discrete LEDs, with each LED within the cluster 202 spaced a distance from the next LED, and each cluster 202 spaced a distance from the next cluster. If the LEDs within a cluster are spaced at too great distance from one another, the colors of the individual sources may become visible, causing unwanted color-striping. In some embodiments, an acceptable range of distances for separating consecutive LEDs within a cluster is not more than approximately 8 mm.

Figure 2A:
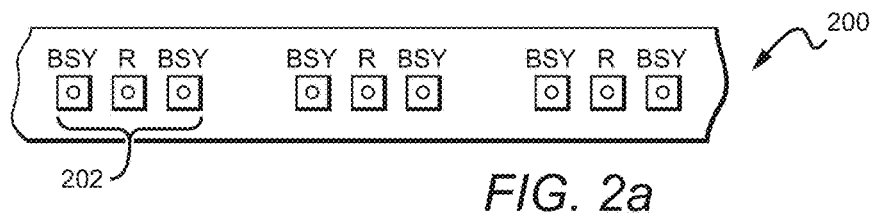
FIGS. 2a-c are schematic representations of linear light arrays that may be used in embodiments of the present invention.
Figure 2B:
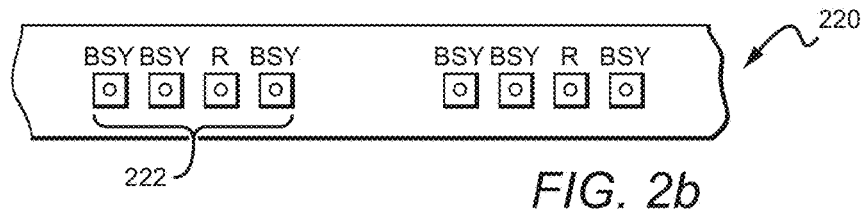
Figure 2C:
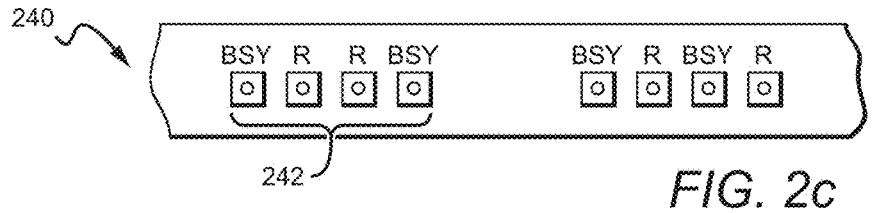

FIGS. 2a-c are schematic in nature. Thus, it is understood that the LEDs do not necessarily have to be arranged linearly within each cluster. In some embodiments, each cluster may have LEDs arranged in a diamond shape or a square shape, for example. Many different intra-cluster arrangements are possible.

The scheme shown in FIG. 2a uses a series of clusters 202 having two blue-shifted-yellow LEDs ("BSY") and a single red LED ("R"). BSY refers to a color created when blue LED light is wavelength-converted by a yellow phosphor. The resulting output is a yellow-green color that lies off the black body curve. BSY and red light, when properly mixed, combine to yield light having a "warm white" appearance. Red light can be added into the system in various ways, for example by using a red LED or a BSY LED with red phosphor. These and other color combinations are described in detail in the previously incorporated patents to Van de Ven (U.S. Pat. Nos. 7,213,940 and 7,768,192).

The lighting arrangement 220 includes clusters 222 of discrete LEDs. The scheme shown in FIG. 2b uses a series of clusters 222 having three BSY LEDs and a single red LED. This scheme will also yield a warm white output when sufficiently mixed.

The lighting arrangement 240 includes clusters 242 of discrete LEDs. The scheme shown in FIG. 2c uses a series of clusters 242 having two BSY LEDs and two red LEDs. This scheme will also yield a warm white output when sufficiently mixed.

The lighting schemes shown in FIGS. 2a-c are meant to be exemplary. Thus, it is understood that many different LED combinations can be used in concert with known conversion techniques to generate a desired output light color.

Figure 1B:
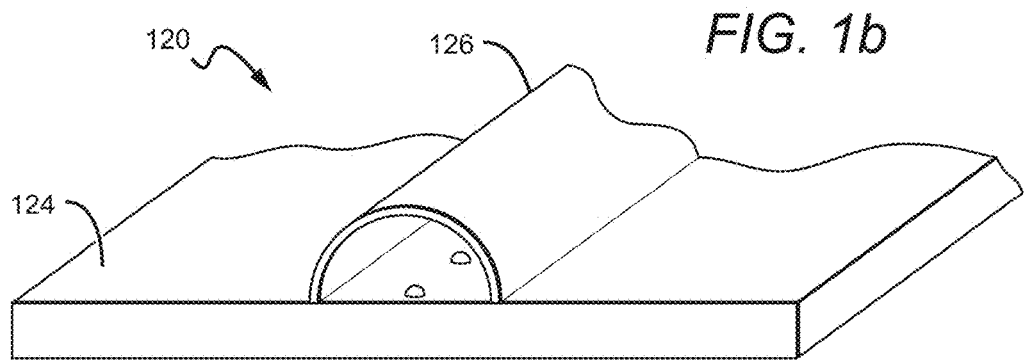
FIG. 1b is a perspective view of a light bar according to an embodiment of the present invention.

Again with reference to FIG. 1, the base 104 may comprise many different materials. For many indoor lighting applications, it is desirable to present a uniform, soft light source without unpleasant glare, color striping, or hot spots. Thus, the base 104 may comprise a diffuse white reflector such as a microcellular polyethylene terephthalate (MCPET) material or a Dupont/WhiteOptics material, for example. Other white diffuse reflective materials can also be used. In some embodiments the base can extend beyond the edges of the lens 106. Such an embodiment is shown in FIG. 1b, which is a perspective view of a light bar 120 according to an embodiment of the present invention. Here, the base 124 extends well beyond the lens 126. In one embodiment, the lens 126 is 25 mm wide, with the base 124 having a total width of 100 mm. It is understood that an extended base can be used with any of the lenses disclosed herein.

Diffuse reflective coatings have the inherent capability to mix light from solid state light sources having different spectra (i.e., different colors). These coatings are particularly well-suited for multi-source designs where two different spectra are mixed to produce a desired output color point. For example, LEDs emitting blue light may be used in combination with LEDs emitting yellow (or BSY) light to yield a white light output. A diffuse reflective coating may help to reduce the need for spatial color-mixing elements that can introduce lossy elements into the system; although, in some embodiments it may be desirable to use a diffuse back reflector in combination with other diffusive elements.

In some embodiments, the base may be coated with a phosphor material that converts the wavelength of at least some of the light from the light emitting diodes to achieve a light output of the desired color point.

The base 104 can comprise materials other than diffuse reflectors. In other embodiments, the base 104 can comprise a specular reflective material or a material that is partially diffuse reflective and partially specular reflective. In some embodiments, it may be desirable to use a specular material in one area and a diffuse material in another area. Many combinations are possible.

The lens 106 can comprise many different elements and materials. In one embodiment, the lens 106 comprises a diffusive element. Some suitable materials for a diffusive lens elements include: Teijin ML-3110ZHP to PC ML-1250Z-100 at ratio of 80 to 20; Teijin ML-3110ZHP diluted with clear PC at various ratios; Sabic LUX2614G-WH5B140X and Sabic LUX2614G-WH5B140X diluted with clear PC at various ratios; and Styron EMERGE 4350 IC1300068 and Styron EMERGE 4350 IC1300068 diluted with clear PC at various ratios. Diffusive lenses function in several ways. For example, they can prevent direct visibility of the emitters and provide additional mixing of the outgoing light to achieve a visually pleasing uniform source. However, a diffusive lens can introduce additional optical loss into the system. Thus, in embodiments where the light is sufficiently mixed by other elements external to the light bar 100 (e.g., fixture elements), a diffusive lens may be unnecessary. In some embodiments, scattering particles may be included in the lens 106.

Diffusive elements in the lens 106 can be achieved with several different structures. A diffusive film inlay can be applied to the light entry surface 106a or the exit surface 106b. It is also possible to manufacture the lens 106 to include an integral diffusive layer, such as by coextruding the two materials or insert molding the diffuser onto the entry or exit surfaces 106a, 106b. A clear lens may include a diffractive or repeated geometric pattern rolled into an extrusion or molded into the surface at the time of manufacture. In another embodiment, the lens material itself may comprise a volumetric diffuser, such as an added colorant or particles having a different index of refraction, for example.

In other embodiments, the lens 106 may be used to optically shape the outgoing beam with the use of microlens structures, for example. Microlens structures are discussed in detail in U.S. patent application Ser. No. 13/442,311 to Lu, et al., which is commonly assigned with the present application to CREE, INC. and incorporated by reference herein.

Several simulations were performed to model the performance of light bars and lenses according to various embodiments of the present invention. All simulations referred to herein were created using the LightTools program from Optical Research Associates. LightTools is a software suite well-known in the lighting industry for producing reliable simulations that provide accurate predictions of performance in the real world. Simulations of the various embodiments discussed below include polar graphs showing radiant intensity (W/sr) versus viewing angle (degrees). The light sources used in the simulations mimic the performance of XLamp XQ-B LEDs that are commercially available from Cree, Inc.

Figure 3A:
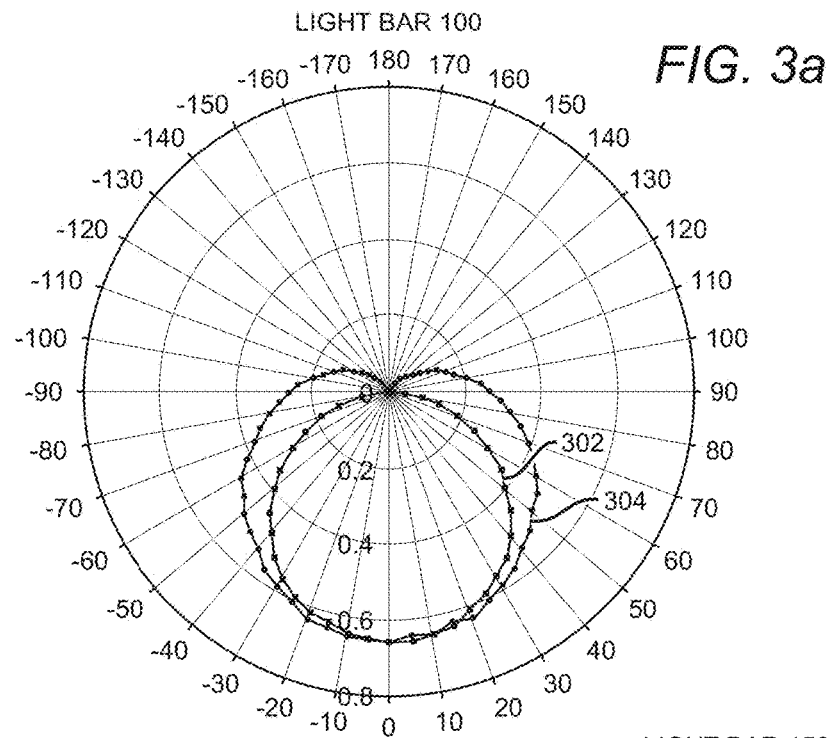
FIGS. 3a and 3b are polar graphs of the radiant intensity (W/sr) over the entire range of viewing angles of a light bar according to an embodiment of the present invention.
Figure 3B:
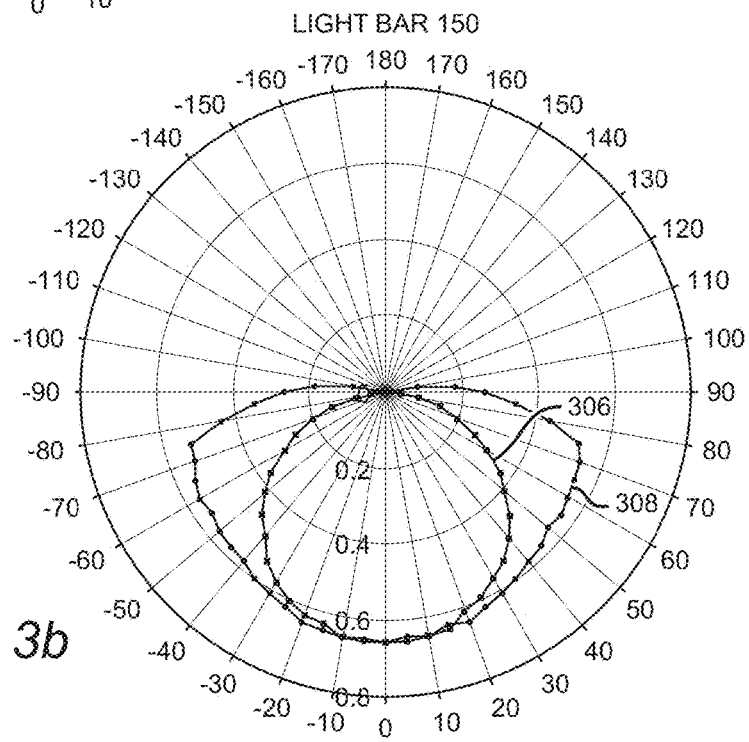

FIGS. 3a and 3b are polar graphs of the radiant intensity (W/sr) over the entire range of viewing angles of the light bar 100. The graph in FIG. 3a was generated modeling a lens and base both having a width of 25 mm. The graph in FIG. 3b was generated modeling a lens and a base having widths of 25 mm and 100 mm, respectively. Two data sets are represented on each graph. The first data sets 302, 306 denoted by the square data points on each graph illustrates the radiant intensity coming from the light bar 100 as the viewing angle is swept from 0° to 360° along a longitudinal plane (y-z plane) down the center of the base, with 0° representing the head-on view (i.e., directly in front of the light bar 100 on the lens side) and 180° representing the back side view (i.e., directly behind the light bar 100 from the base side). The second data sets 304, 308 denoted by the circle data points shows the radiant intensity coming from the light bar 100 as the viewing angle is swept from 0° to 360° along a transverse plane (x-z plane) through the center of one of the emitters. All of the polar graphs disclosed herein were generated with the same modeled measurement method.

FIGS. 4a and 4b include a false color image graph from the normal direction (z-axis) view juxtaposed with a data plot showing luminance (Cd/m$^2$) versus transverse position (x-position in mm) across the faces of two different lensed troffer-style fixtures (2×4 ft). In FIG. 4a, the troffer fixture uses a pair of typical fluorescent tubes as the light source. As shown, the luminance increases for the areas of the troffer directly beneath each of the tubes, with a maximum luminance close to 14,000 Cd/m$^2$. In FIG. 4b, an LED retrofit kit including a light bar similar to light bar 100 shown in FIG. 1 is used as the light source. Again, the luminance increases beneath the sources with a peak luminance of 31,000 Cd/m$^2$ directly under the light bars.

Thus, the light bars in FIG. 4b have a much brighter footprint than the fluorescent tubes in FIG. 4a. This is due, in part, to the directional nature of the LED sources. Using a hemispherical lens as in light bar 100, most of the light from the LEDs is emitted in a forward direction with very little light emitted/redirected sideways or back toward the diffusive base on which the LEDs are mounted. In order to reduce source imaging and glare, some embodiments of the present invention include lenses shaped to redirect at least some light from the emitters away from the normal axis, toward the sides of the fixture. Several lens geometries designed to change the light distribution from near-Lambertian to a profile in which more of the light is redirected to the sides or back toward the base (uplight) are discussed in detail herein.

Figure 5:
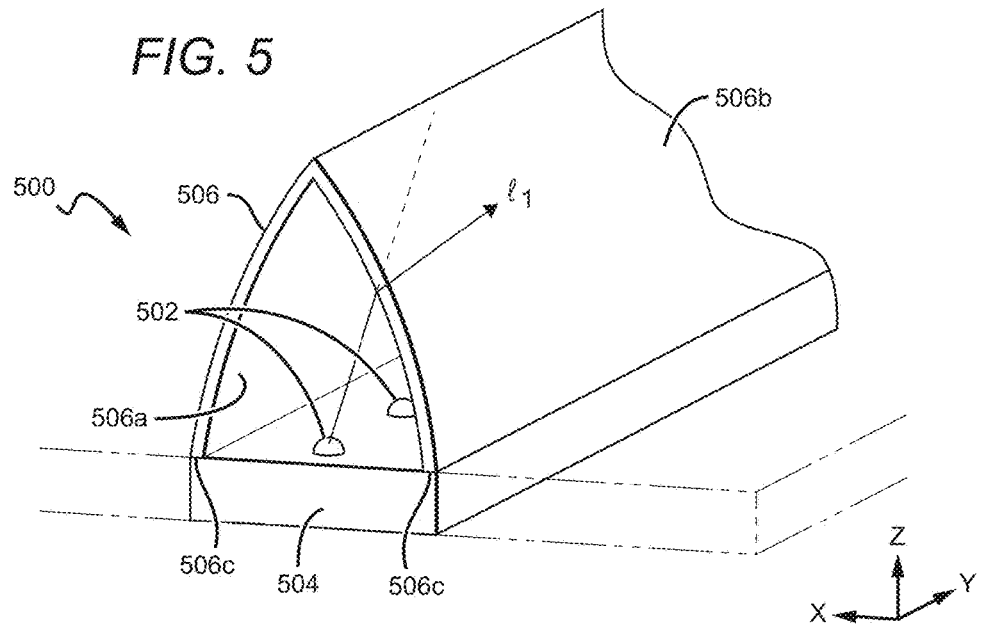
FIG. 5 is a perspective cutaway view of a light bar according to an embodiment of the present invention.

FIG. 5 is a perspective cutaway view of a light bar 500 according to an embodiment of the present invention. The light bar 500 comprises a plurality of light emitters (e.g., LEDs) 502 mounted on an elongated reflective base 504 along a longitudinal axis (y-axis). Here, the emitters 502 are mounted in the center of the base 504; although, in other embodiments emitters can be mounted at off-center positions on the base along the transverse axis (x-axis). An elongated lens 506 is mounted over the emitters 502 on the base 504 such that light emitted from the emitters 502 impinges on the lens 506 prior to escaping the light bar 500.

In this embodiment, the base 504 is coextensive with the lens 506; however, in other embodiments the base 504 may extend past the edges of the lens 506 as shown with phantom lines in FIG. 5. In one particular embodiment the base 504 and lens 506 are both 25 mm wide. In another embodiment the base 504 extends past the edges of the lens 506 such that the lens 506 is 25 mm wide and the base 504 is 100 mm wide, for example. It is understood that in each of the embodiments discussed herein the base can be coextensive with the lens, or it can extend beyond the edge of the lens.

The lens 506 is shaped to redirect at least some of the light from the emitters 502 away from the normal axis (z-axis).

This particular lens 506 has a cross-section that is generally defined by two convex curved portions that meet at a central vertex. Using this optical geometry some of the light (e.g., light ray $l_1$) that impinges on the entry surface 506a will be redirected out the exit surface 506b in more of a sideways direction. Many different lens shapes may be used for this purpose, several of which are specifically discussed herein as exemplary embodiments. However, it is understood that many different lens shape variations are possible to achieve a desired optical distribution.

Figure 6A:
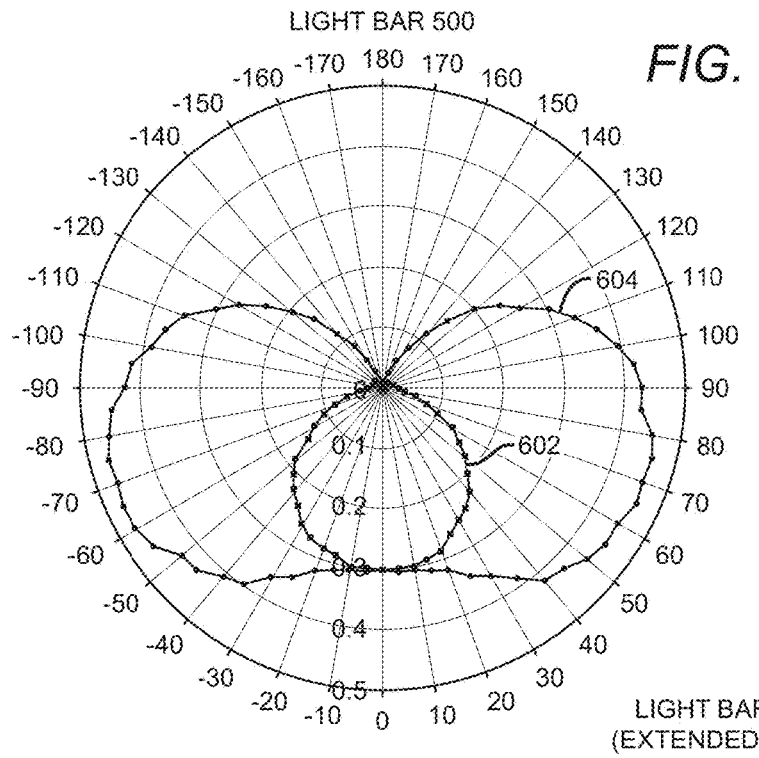
FIGS. 6a and 6b are polar graphs of the radiant intensity (W/sr) over the entire range of viewing angles of the light bar in FIG. 5.
Figure 6B:
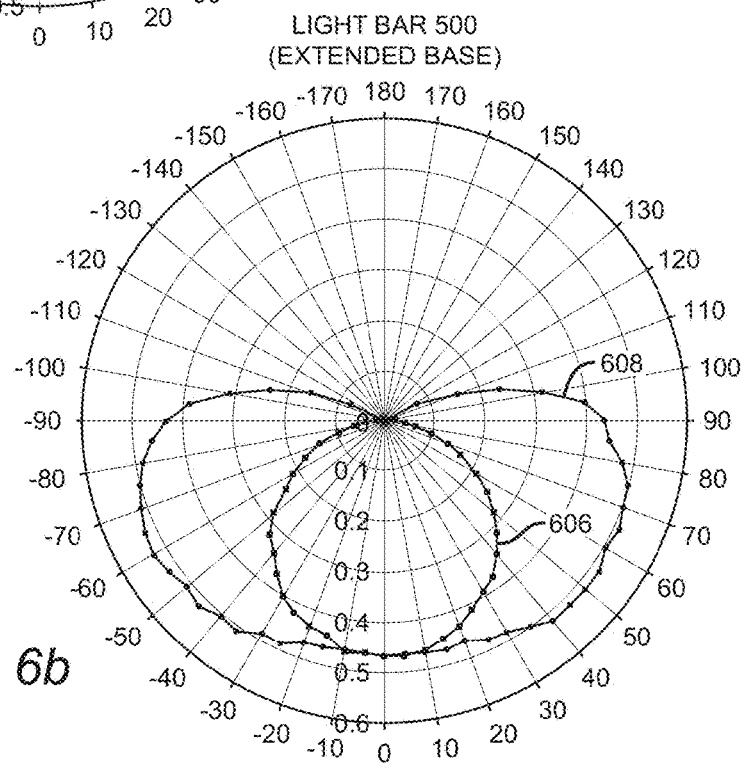

FIGS. 6a and 6b are polar graphs of the radiant intensity (W/sr) over the entire range of viewing angles of the light bar 500. The graph in FIG. 6a was generated modeling a lens and base both having a width of 25 mm. The graph in FIG. 6b was generated modeling a lens and a base having widths of 25 mm and 100 mm, respectively. In FIG. 6a, the first data set 602, taken along the longitudinal plane, is near Lambertian. The second data set 604, taken along the transverse plane, exhibits two side lobes, indicating that more of the light that is emitted from the lens 500 is being emitted in a sideways direction away from the normal axis, and back toward the base 504 as uplight (light having an emission angle with an absolute value greater than 90°). Some of the uplight will be redirected by the base 504 back out into the system as useful emission, with each bounce on the diffusive base 504 improving the uniformity of the output profile.

FIG. 6b models the light bar 500 having the extended base 504 and includes first and second data sets 606, 608. Compared to the system in FIG. 6a, the data set 608 illustrates that less light is emitted toward the sides and back toward the base 504, redistributing some of that light into the front angle range (−20° to 20°). The extended base redirects the light such that it is more evenly distributed over the entire range of forward viewing angles (−90° to 90°).

Figure 7:
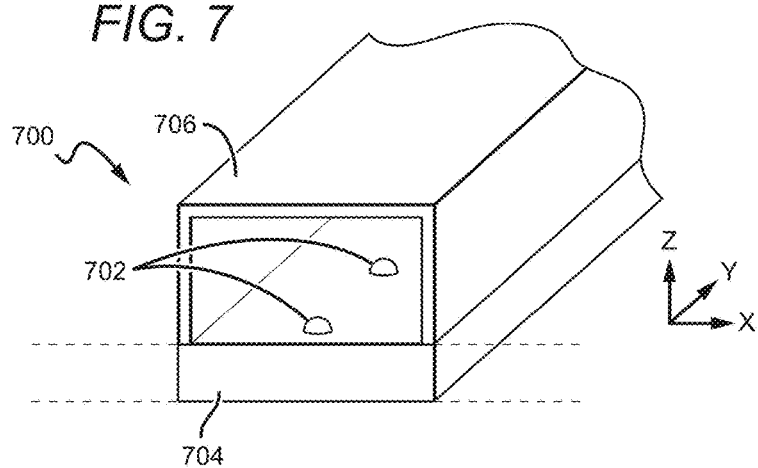
FIG. 7 is a perspective cutaway view of a light bar according to an embodiment of the present invention.

FIG. 7 is a perspective cutaway view of a light bar 700 according to an embodiment of the present invention. The light bar 700 comprises a plurality of light emitters 702 mounted on an elongated reflective base 704. The emitters 702 are mounted in the center of the base 704; although, in other embodiments emitters can be mounted at off-center positions on the base along the transverse axis. An elongated lens 706 is mounted over the emitters 702 on the base 704 such that light emitted from the emitters 702 impinges on the lens 706 prior to escaping the light bar 700. The lens 706 is shaped to redirect at least some of the light from the emitters 702 away from the normal axis. This particular lens 706 has a cross-section that is generally defined by three sides of a rectangle.

Figure 8A:
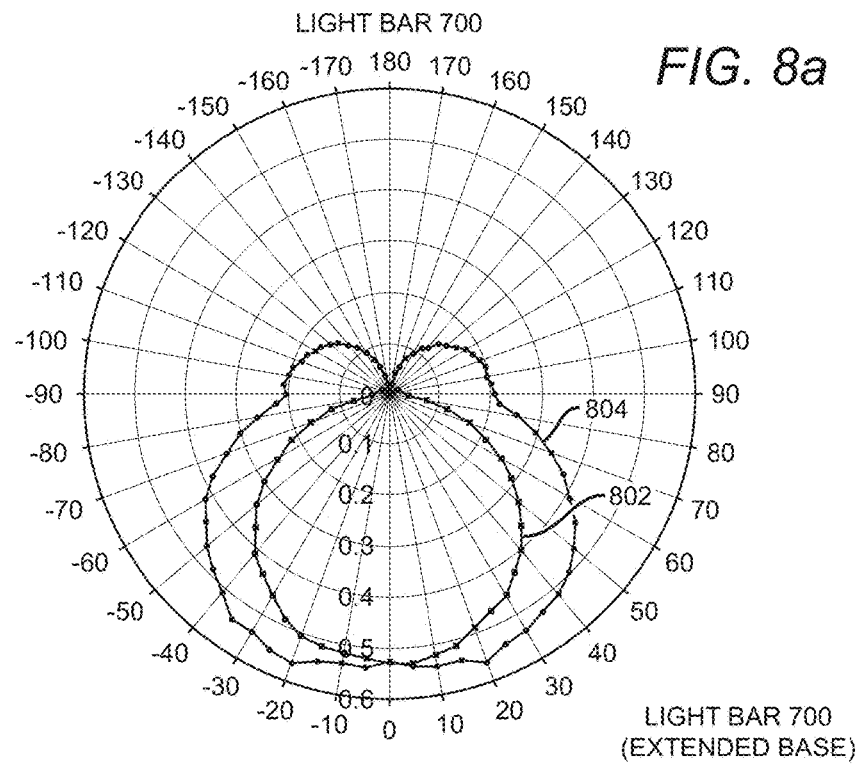
FIGS. 8a and 8b are polar graphs of the radiant intensity (W/sr) over the entire range of viewing angles of the light bar in FIG. 7.
Figure 8B:
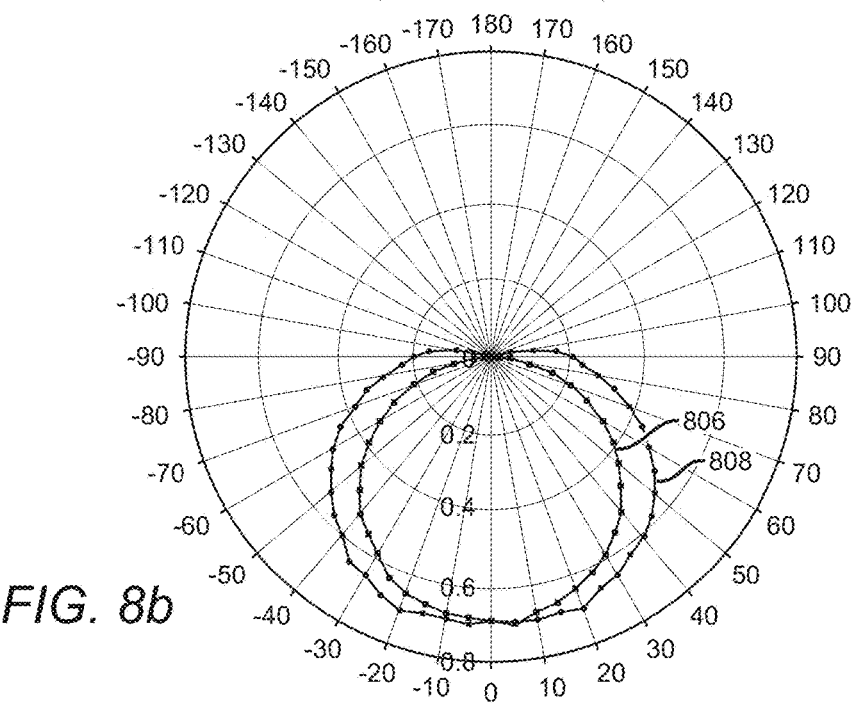

FIGS. 8a and 8b are polar graphs of the radiant intensity (W/sr) over the entire range of viewing angles of the light bar 700. The graph in FIG. 8a was generated modeling a lens and base both having a width of 25 mm. The graph in FIG. 8b was generated modeling a lens and a base having widths of 25 mm and 100 mm, respectively. In FIG. 8a, the first data set 802 is near Lambertian. The second data set 804 exhibits two back side lobes, indicating that more of the light that is emitted from the lens 700 is being emitted back toward the base 704 as uplight. Thus, this configuration may be desirable for applications calling for uplight, such as a commercial suspended fixture where ceiling light is required, for example. Many other applications are possible.

FIG. 8b models the light bar 700 having the extended base 704 and includes first and second data sets 806, 808. Compared to the system in FIG. 8a, the data set 808 illustrates that less light is emitted as uplight, hence the back side lobes are much less pronounced. The extended base redirects the light such that it is more evenly distributed over the entire range of forward viewing angles (−90° to 90°).

Figure 9:
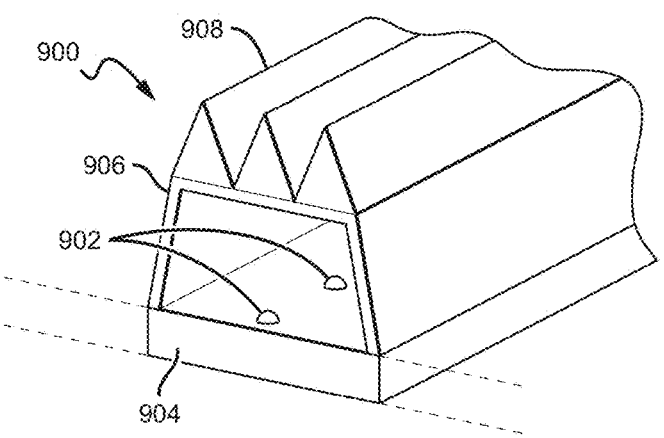
FIG. 9 is a perspective cutaway view of a light bar according to an embodiment of the present invention.

FIG. 9 is a perspective cutaway view of a light bar 900 according to an embodiment of the present invention. The light bar 900 comprises a plurality of light emitters 902 mounted on an elongated reflective base 904. The emitters 902 are mounted in the center of the base 904; although, in other embodiments emitters can be mounted at off-center positions on the base along the transverse axis. An elongated lens 906 is mounted over the emitters 902 on the base 904 such that light emitted from the emitters 902 impinges on the lens 906 prior to escaping the light bar 900. The lens 906 is shaped to redirect at least some of the light from the emitters 902 away from the normal axis. This particular lens 906 has a cross-section that is generally defined by three sides of a trapezoid.

Additionally, the lens 906 comprises a prismatic element 908. The prismatic element 908 can be shaped and sized in various ways to achieve a particular effect. The prismatic element 908 can be manufactured as a monolithic component of the lens 906, such as by co-extrusion, or it can be manufactured separately and then attached to the lens body using an optical adhesive, for example. The prismatic element 908 may be made from many different materials and may function to both mix and shape the outgoing light. It may be diffusive or clear. In this particular embodiment, the prismatic element is made from a clear material and has a cross-section that is generally defined by three adjacent triangles. It is understood that more or fewer triangles may be used.

Figure 10A:
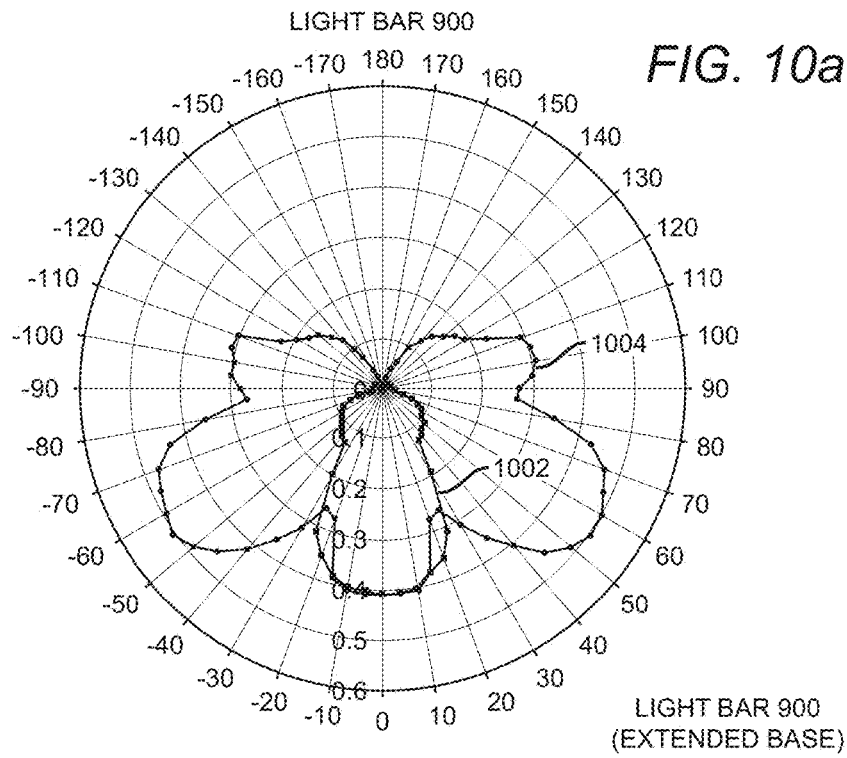
FIGS. 10a and 10b are polar graphs of the radiant intensity (W/sr) over the entire range of viewing angles of the light bar in FIG. 9.
Figure 10B:
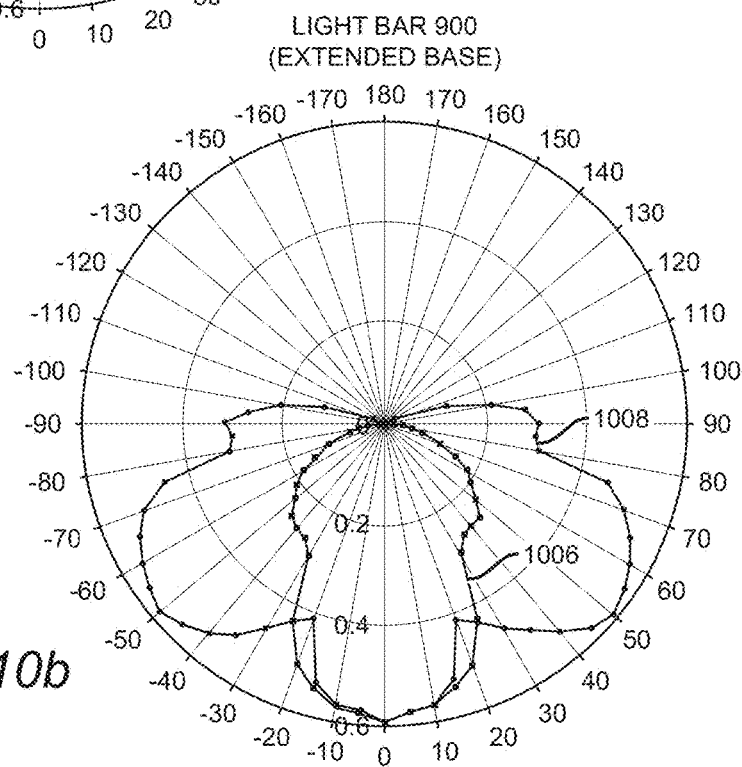

FIGS. 10a and 10b are polar graphs of the radiant intensity (W/sr) over the entire range of viewing angles of the light bar 900. The graph in FIG. 10a was generated modeling a lens and base both having a width of 25 mm. The graph in FIG. 10b was generated modeling a lens and a base having widths of 25 mm and 100 mm, respectively. In FIG. 10a, the first data set indicates that most of the light along the longitudinal plane is focused in the front side angle range. The second data set 1004 exhibits five pronounced lobes, two on the back side, two in the mid-range angles (±20° to ±70°), and one on the front side. This second data set provides a more exotic curve than those found in the previous embodiments without the prismatic element 908, modeling a less uniform output profile in terms of intensity, which may be desirable in some cases.

FIG. 10b models the light bar 900 having the extended base 904 and includes first and second data sets 1006, 1008. Compared to the system in FIG. 10a, the data set 1008 illustrates that less light is emitted as uplight; hence the back side lobes are much less pronounced. The extended base redirects the light such that it is more evenly distributed over the entire range of forward viewing angles (−90° to 90°). Nonetheless, the distribution still features pronounced lobes in the mid-range and front side angle ranges. Such a distribution might be desirable for lighting aisles in warehouse, for example, where the large amount of light in the mid-range angles could be used to illuminate tall shelves on either side of the aisle. Many other applications are also possible.

Figure 11:
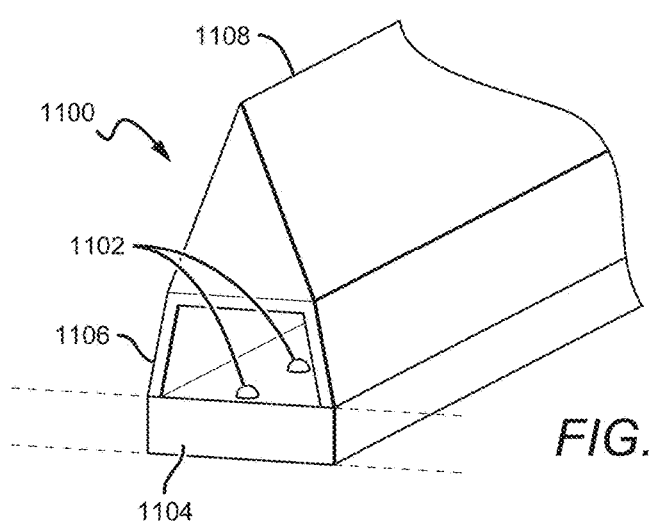
FIG. 11 is a perspective cutaway view of a light bar according to an embodiment of the present invention.

FIG. 11 is a perspective cutaway view of a light bar 1100 according to an embodiment of the present invention. The light bar 1100 comprises a plurality of light emitters 1102 mounted on an elongated reflective base 1104. The emitters 1102 are mounted in the center of the base 1104; although, in other embodiments emitters can be mounted at off-center positions on the base along the transverse axis. An elongated lens 1106 is mounted over the emitters 1102 on the base 1104 such that light emitted from the emitters 1102 impinges on the lens 1106 prior to escaping the light bar 1100. The lens 1106 is shaped to redirect at least some of the light from the emitters 1102 away from the normal axis. This particular lens 1106 has a cross-section that is generally defined by three sides of a trapezoid.

Similarly as the lens 906, the lens 1106 comprises a prismatic element 1108. The prismatic element 1108 can be shaped and sized in various ways to achieve a particular effect. As previously noted, the prismatic element 1108 can be manufactured as a monolithic component of the lens 1106, or it can be manufactured separately and then attached to the lens body. The prismatic element 1108 may be made from many different materials and may function to both mix and shape the outgoing light. In this particular embodiment, the prismatic element is clear and has a cross-section that is generally defined by a triangle.

Figure 12B:
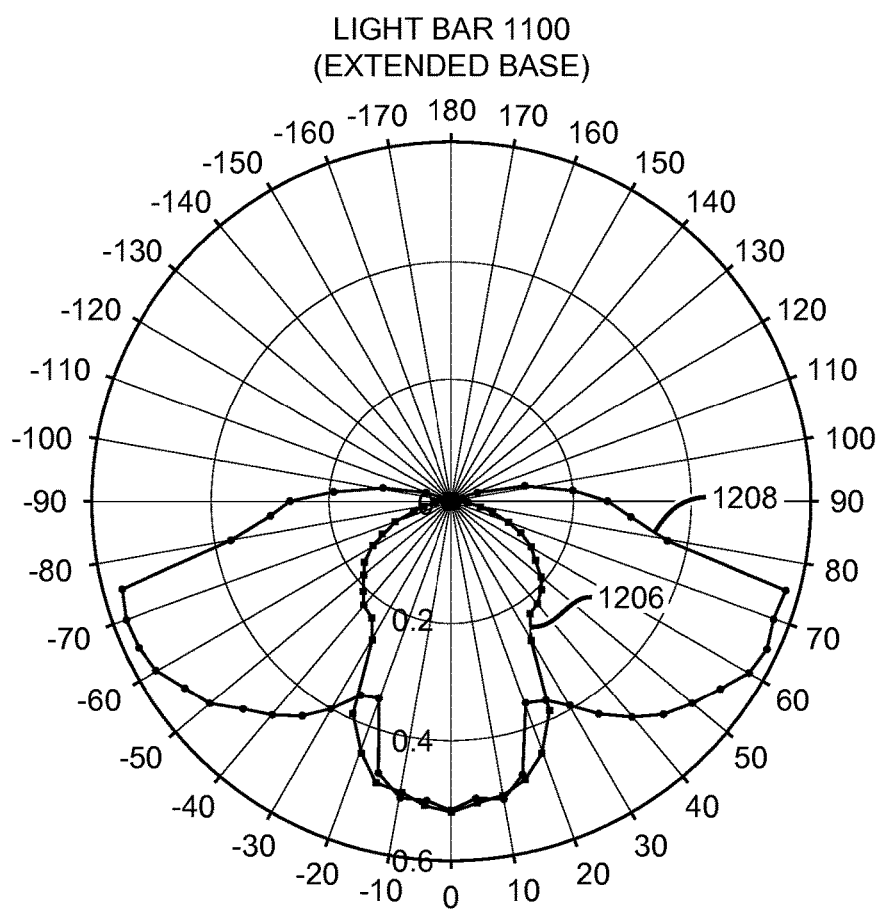

FIGS. 12a and 12b are polar graphs of the radiant intensity (W/sr) over the entire range of viewing angles of the light bar 1100. The graph in FIG. 12a was generated modeling a lens and base both having a width of 25 mm. The graph in FIG. 12b was generated modeling a lens and a base having widths of 25 mm and 100 mm, respectively. In FIG. 12a, the first data set 1202 shows that the light in the longitudinal plane is primarily directed in the forward angles. The second data set 1204 exhibits two wing-shaped lobes with protrusions into the uplight region. In the mid-range angles the wing-shaped lobes provide a significant intensity peak around ±70°. Another smaller front side lobe indicates a smaller intensity peak head-on at 0°, but much smaller than those in the mid-range. Again, this model predicts a less uniform output profile in terms of intensity than those embodiments without prismatic elements.

FIG. 12b models the light bar 1100 having the extended base 1104 and includes first and second data sets 1206, 1208. Compared to the system in FIG. 12a, the data set 1208 illustrates that less light is emitted as uplight; hence the back side lobes are much less pronounced. The extended base redirects the light such that it is more evenly distributed over the mid-range and the front side viewing angles. Nonetheless, the lobes are still significant, indicating sharp intensity peaks and less overall uniformity.

FIG. 13 is a perspective cutaway view of a light bar 1300 according to an embodiment of the present invention. The light bar 1300 comprises a plurality of light emitters 1302 mounted on an elongated reflective base 1304. The emitters 1302 are mounted in the center of the base 1304; although, in other embodiments emitters can be mounted at off-center positions on the base along the transverse axis. An elongated lens 1306 is mounted over the emitters 1302 on the base 1304 such that light emitted from the emitters 1302 impinges on the lens 1306 prior to escaping the light bar 1300. The lens 1306 is shaped to redirect at least some of the light from the emitters 1302 away from the normal axis. This particular lens 1306 has a cross-section that is generally defined by an oval. It is understood that other embodiments featuring an oval-shaped lens can have different dimensions to achieve a particular effect.

FIG. 14 is a polar graph of the radiant intensity (W/sr) over the entire range of viewing angles of the light bar 1300. The graph in FIG. 14 was generated modeling a lens and base both having a width of 25 mm. In FIG. 14, the first and second data sets 1402, 1404 both exhibit two circular lobes, with the smaller lobe in the uplight region and the larger lobe in the front side. Thus, this light bar 1300 provides significant intensity concentration in the head-on angles and to a lesser degree directly behind in the back side angles. Again, this model predicts a less uniform output profile in terms of intensity than those embodiments without prismatic elements. Such a configuration would be useful for applications where light is primarily needed directly above and below the fixture, such as a suspended fixture.

Lens and light bar elements disclosed herein may be inserted into preexisting troffer-style fixtures, or these elements may be incorporated into new light fixtures that are ready for installation. One exemplary troffer-style fixture is shown in FIGS. 15 and 16. Other examples of these kinds of fixtures are found in U.S. patent application Ser. No. 13/763,270 to Heeter et al., and assigned to Cree, Inc., which is commonly assigned with the present application and fully incorporated by reference herein.

FIG. 15 is a perspective view of a light fixture 150 according to an embodiment of the present invention. A fixture housing 152, such as a pan structure, surrounds the internal elements and defines the mechanical footprint of the fixture 150. Mounting brackets 154 are used to hold light bars 156 in place within the fixture 150. The mounting brackets 154 correctly orient and space the light bars 156, hold the light bars 156 in place, and provide a wiring path from the light bars 156 to the power supply 160, both hiding the wiring and providing desired spacing or enclosures for electrical ratings, such as high voltage regulatory requirements. A ballast or raceway cover 158 may be used to protect the power supply 160 and secure the mounting brackets 154.

FIG. 16 is a perspective view of the fixture 150 with the raceway cover 158 removed to reveal the components of the power supply 160 underneath. Wires 162 electrically connect the power supply 160 to the terminals of the light bars 156.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. Therefore, the spirit and scope of the invention should not be limited to the versions described above.

We claim:

1. A lens, comprising:
an elongated body having a hemispherical cross-section running along a longitudinal axis, said body comprising at least one light entry surface, at least one exit surface, and two or more mount surfaces defining a mounting plane, wherein said two or more mount surfaces contact an upper surface of a reflective base, wherein at least one light source is also mounted on said upper surface of said reflective base;
wherein said body is shaped to redirect at least some light from said at least one light source that impinges said light entry surface in a direction away from a normal axis that is perpendicular to said mounting plane, wherein the width of said reflective base is equal to or greater than the width of said elongated body.

2. The lens of claim 1, said body having a cross-section that is generally defined by two convex curved portions that meet at a central vertex.

3. The lens of claim 1, said body having a cross-section that is generally defined by three sides of a rectangle.

4. The lens of claim 1, said body having a cross-section that is generally defined by three sides of a trapezoid.

5. The lens of claim 1, further comprising an elongated prismatic element on one of said exit surfaces opposite said mounting plane.

6. The lens of claim 5, said prismatic element having a cross-section that is generally defined by a triangle.

7. The lens of claim 5, said prismatic element having a cross-section that is generally defined by at least two adjacent triangles.

8. The lens of claim 1, said body having a cross-section that is generally defined by an oval.

9. A light bar, comprising:
an elongated reflective base running along a longitudinal axis and defining a normal axis perpendicular to said base;
at least one light emitter on an upper surface of said base; and
an elongated lens in contact with said upper surface of said base surrounding said at least one light emitter, such that light from said at least one light emitter impinges on said lens, said lens shaped to redirect at least some light from said at least one emitter away from said normal axis, wherein said upper surface of said base extends beyond the width of said lens.

10. The light bar of claim 9, said lens having a cross-section that is generally defined by two convex curved portions that meet at a central vertex.

11. The light bar of claim 9, said lens having a cross-section that is generally defined by three sides of a rectangle.

12. The light bar of claim 9, said lens having a cross-section that is generally defined by three sides of a trapezoid.

13. The light bar of claim 9, further comprising an elongated prismatic element on an exit surface of said lens opposite said base.

14. The light bar of claim 13, said prismatic element having a cross-section that is generally defined by a triangle.

15. The light bar of claim 13, said prismatic element having a cross-section that is generally defined by at least two adjacent triangles.

16. The light bar of claim 9, said lens having a cross-section that is generally defined by an oval.

17. A light fixture, comprising:
a fixture housing;
at least one light bar attached to said housing, each of said light bars comprising:
an elongated reflective base running along a longitudinal axis and defining a normal axis perpendicular to said base;
at least one light emitter on said base; and
an elongated lens on said base surrounding said at least one light emitter, such that light from said at least one light emitter impinges on said lens, said lens shaped to redirect at least some light from said at least one emitter away from said normal axis, wherein the width of said reflective base is equal to or greater than the width of said elongated lens; and
a control circuit to control said at least one light emitter.

18. The light fixture of claim 17, said lens having a cross-section that is generally defined by two convex curved portions that meet at a central vertex.

19. The light fixture of claim 17, said lens having a cross-section that is generally defined by three sides of a rectangle.

20. The light fixture of claim 17, said lens having a cross-section that is generally defined by three sides of a trapezoid.

21. The light fixture of claim 17, further comprising an elongated prismatic element on an exit surface of said lens opposite said base.

22. The light fixture of claim 21, said prismatic element having a cross-section that is generally defined by a triangle.

23. The light fixture of claim 21, said prismatic element having a cross-section that is generally defined by at least two adjacent triangles.

24. The light fixture of claim 17, said lens having a cross-section that is generally defined by an oval.

* * * * *